US012634947B2

(12) United States Patent 
Fu

(10) Patent No.: US 12,634,947 B2 
(45) Date of Patent: May 19, 2026

(54) METHOD FOR PROCESSING MULTIPLE RESOURCE CONFLICTS AND TERMINAL DEVICE

(71) Applicant: GUANGDONG OPPO MOBILE TELECOMMUNICATIONS CORP., LTD., Dongguan (CN)

(72) Inventor: Zhe Fu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 325 days.

(21) Appl. No.: 17/969,002

(22) Filed: Oct. 19, 2022

(65) Prior Publication Data

US 2023/0044732 A1 Feb. 9, 2023

Related U.S. Application Data

(63) Continuation of application No. PCT/CN2020/085997, filed on Apr. 21, 2020.

(51) Int. Cl.
| | |
|---|---|
| *H04W 72/23* | (2023.01) |
| *H04W 72/56* | (2023.01) |
| *H04W 72/566* | (2023.01) |

(52) U.S. Cl.
CPC ......... *H04W 72/23* (2023.01); *H04W 72/569* (2023.01)

(58) Field of Classification Search
CPC ............................. H04W 72/23; H04W 72/569
See application file for complete search history.

(56) References Cited

U.S. PATENT DOCUMENTS

| | | | |
|---|---|---|---|
| 10,104,568 B2 | 10/2018 | Chen et al. | |
| 2020/0221490 A1* | 7/2020 | Baek | H04W 28/0278 |
| 2021/0127402 A1* | 4/2021 | Lee | H04W 72/56 |
| 2021/0307027 A1* | 9/2021 | Kung | H04W 72/1268 |

FOREIGN PATENT DOCUMENTS

| | | |
|---|---|---|
| CN | 108024285 A | 5/2018 |
| CN | 108513735 A | 9/2018 |
| CN | 108811117 A | 11/2018 |
| CN | 110249671 A | 9/2019 |
| CN | 110536463 A | 12/2019 |
| CN | 110536563 A | 12/2019 |
| CN | 110636626 A | 12/2019 |
| CN | 111031599 A | 4/2020 |

(Continued)

OTHER PUBLICATIONS

Second Office Action issued in corresponding Japanese application No. 2022-564092, mailed Mar. 29, 2024.

(Continued)

*Primary Examiner* — Ronald B Abelson 
(74) *Attorney, Agent, or Firm* — BAYES PLLC

(57) ABSTRACT

Embodiments of the present disclosure provide a method for processing multiple resource conflicts and a terminal device, used for avoiding unnecessary resource transmission blocking and ensuring priority resource transmission. The method may comprise: when a target priority comparison mode is configured for a medium access control (MAC) entity, for each uplink grant, performing priority comparison between the uplink grant and a compared resource.

16 Claims, 5 Drawing Sheets

(56)                  References Cited

FOREIGN PATENT DOCUMENTS

| | | |
|---|---|---|
| CN | 111163518 A | 5/2020 |
| CN | 111294936 A | 6/2020 |
| CN | 111386750 A | 7/2020 |
| EP | 3582429 A1 | 12/2019 |
| EP | 3813417 A1 | 4/2021 |
| EP | 3890429 A1 | 10/2021 |
| WO | 2019095112 A1 | 5/2019 |
| WO | 2019162929 A1 | 8/2019 |
| WO | 2020027599 A1 | 2/2020 |
| WO | 2020057240 A1 | 3/2020 |

OTHER PUBLICATIONS

Priority Review issued in corresponding Chinese application No. 202211533892.2, mailed May 30, 2024.
First Office Action issued in corresponding Chinese application No. 202211533892.2, mailed Jun. 5, 2024.
Hearing Notice issued in corresponding Indian application No. 202227064347, mailed Nov. 9, 2023.
First Office Action issued in corresponding Japanese application No. 2022-564092, mailed Nov. 28, 2023.
3GPP TS 38.321 V16.0.0 (Mar. 2020); Technical Specification Group Radio Access Network;NR;Medium Access Control (MAC) protocol specification(Release 16).
Source: Samsung; Title: Condition of Priority Value Determination 3GPP TSG-RAN2 Meeting #109-e R2-2001494 Feb. 24-Mar. 6, 2020.
First Office Action issued in corresponding Indian application No. 202227064347, mailed Feb. 3, 2023.
Extended European Search Report issued in corresponding European application No. 20932549.7, mailed Mar. 7, 2023.
Nokia et al., "Analysis of Intra-UE Data Prioritization Schemes", R2-1906187, 3GPP TSG-RAN WG2 Meeting #106 Reno, NV, USA, May 13-17, 2019.
Samsung, "Report of [Offline-036][IIOT] Data Data and Data SR prioritization", R2-2002190, 3GPP TSG-RAN2 Meeting #109-e Feb. 24-Mar. 6, 2020.
Qualcomm Incorporated, "Open issues in Intra-UE prioritization", R2-2001289, 3GPP TSG-RAN WG2 Meeting #109 electronic Feb. 24-Mar. 6, 2020.
Decision of Refusal issued in corresponding Japanese Application No. 22-564092, dated Jul. 12, 2024, 8 pages.
Notice of the Second Review Opinion issued in corresponding Chinese Application No. 20221153892.2, dated Sep. 6, 2024, 20 pages.
ASUSTeK, "Prioritization between CG and uplink grant for Msg3 or MSGA payload", R2-2003647, 3GPP TSG-RAN WG2 Meeting #109bis-e Electronic Apr. 20-30, 2020.
International Search Report issued in International application No. PCT/CN2020/085997, mailed Jan. 22, 2021.
Written Opinion of the International Searching Authority issued in International application No. PCT/CN2020/085997, mailed Jan. 22, 2021.
3GPP TS 38.321 V16.5.0 (Jun. 2021); Technical Specification Group Radio Access Network; NR; Medium Access Control (MAC) protocol specification (Release 16).
3GPP TS 38.331 V16.5.0 (Jun. 2021); Technical Specification Group Radio Access Network; NR; Radio Resource Control (RRC) protocol specification (Release 16).
Samsung, "De-prioritization by Other Deprioritized Grants", R2-2002945, 3GPP TSG-RAN WG2 Meeting #109bis-e Electronic, Apr. 20-Apr. 30, 2020.
CATT, "Remaining issues for intra-UE multiplexing and prioritization", R2-2000115, 3GPP TSG-RAN WG2 Meeting #109 Elbonia, Feb. 24-Mar. 6, 2020.
Request for the Submission of an Opinion issued in corresponding Korean Application No. 10-2022-7040364, mailed on May 21, 2025, 22 pages.
International Search Report issued in corresponding International Application No. PCT/CN2020/107990, mailed on Apr. 30, 2021, 10 pages.
Written Opinion of the International Searching Authority issued in corresponding International Application No. PCT/CN2020/107990, mailed on Apr. 30, 2021, 13 pages.
Extended European Search Report issued in corresponding European Application No. 20947962.5, mailed Oct. 4, 2025, 14 pages.
Supplementary Partial European Search Report issued in corresponding European Application No. 20947962.5, mailed Jun. 29, 2023, 18 pages.
Extended European Search Report issued in corresponding European Application No. 24203335.5, mailed Dec. 23, 2024, 9 pages.
"TP for LCH-priority based Data-Data and SR-Data prioritization", Agenda item: 6.7.3.2, Source: Samsung, 3GPP TSG-RAN2 Meeting #108, R2-1916526, Reno, USA, Nov. 18-22, 2019, 15 pages.
Change Request, 3GPP TSG-RAN WG2 Meeting #109bis-e R2-2003170, Elbonia, Online, Apr. 20-30, 2020, 5 pages.
"On enhanced inter-UE UL Multiplexing for eURLLC", Source: Intel Corporation, Agenda item: 7.2.6.2, 3GPP TSG RAN WG1 Meeting #95, R1-1812505, Spokane, USA, Nov. 12-16, 2018, 10 pages.
"LCH Mapping Restriction issues with DC+CA PDCP Duplication", Agenda item: 6.5.1, Source: Nokia, Nokia Shanghai Bell, 3GPP TSG-RAN WG2 Meeting #111-e, R2-2006917, Online, Aug. 17-28, 2020, 4 pages.
Notice of Final Rejection issued in corresponding Korean Application No. 10-2022-7040364, mailed on Jan. 26, 2026, 11 pages.

* cited by examiner

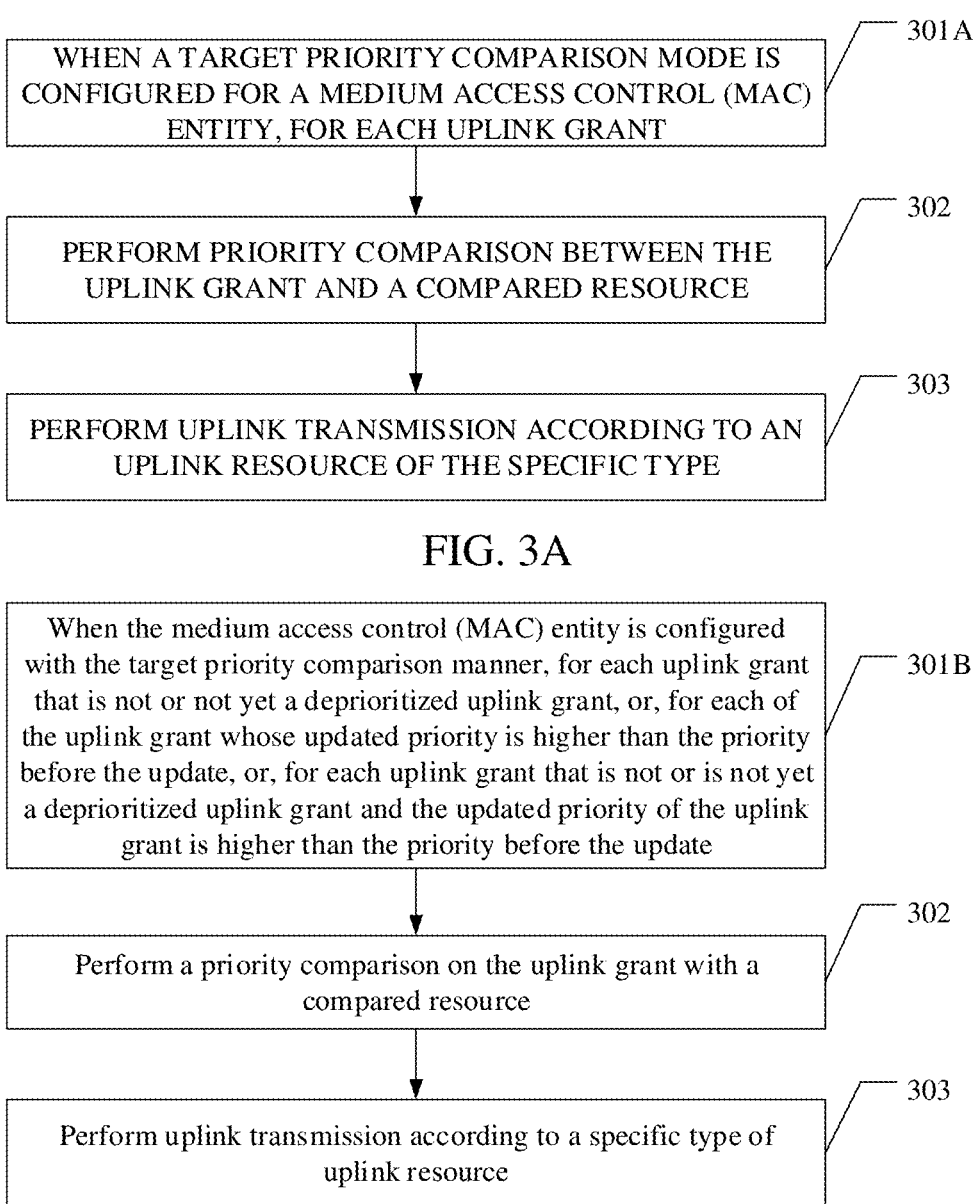

WHEN A TARGET PRIORITY COMPARISON MODE IS CONFIGURED FOR A MEDIUM ACCESS CONTROL (MAC) ENTITY, FOR EACH UPLINK GRANT — 301A

PERFORM PRIORITY COMPARISON BETWEEN THE UPLINK GRANT AND A COMPARED RESOURCE — 302

PERFORM UPLINK TRANSMISSION ACCORDING TO AN UPLINK RESOURCE OF THE SPECIFIC TYPE — 303

FIG. 3A

When the medium access control (MAC) entity is configured with the target priority comparison manner, for each uplink grant that is not or not yet a deprioritized uplink grant, or, for each of the uplink grant whose updated priority is higher than the priority before the update, or, for each uplink grant that is not or is not yet a deprioritized uplink grant and the updated priority of the uplink grant is higher than the priority before the update — 301B Perform a priority comparison on the uplink grant with a compared resource — 302

Perform uplink transmission according to a specific type of uplink resource — 303

FIG. 3B

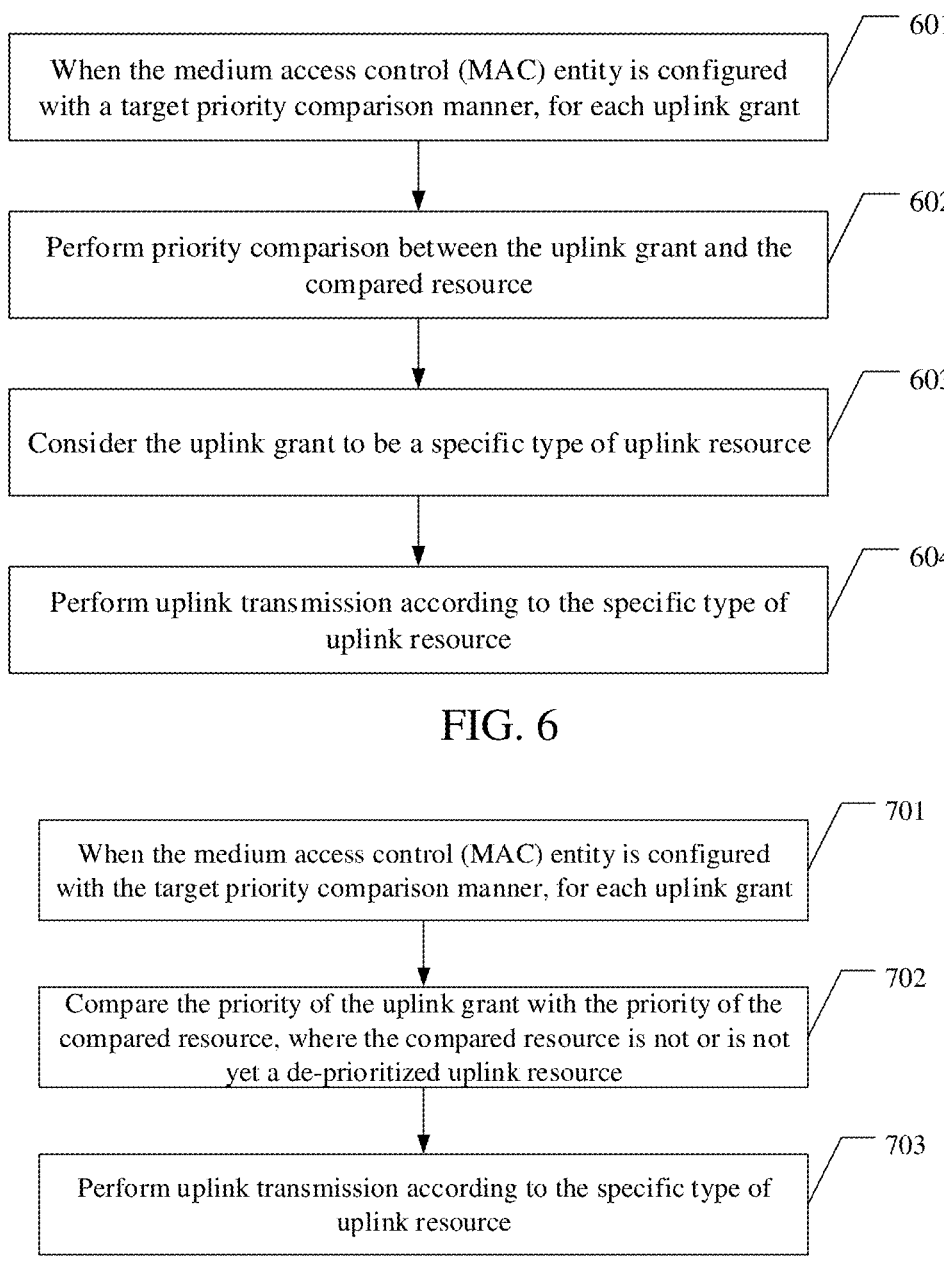

601

When the medium access control (MAC) entity is configured
with a target priority comparison manner, for each uplink grant

602

Perform priority comparison between the uplink grant and the
compared resource

603

Consider the uplink grant to be a specific type of uplink resource

604

Perform uplink transmission according to the specific type of
uplink resource

When the medium access control (MAC) entity is configured
with the target priority comparison manner, for each uplink grant

702

Compare the priority of the uplink grant with the priority of the
compared resource, where the compared resource is not or is not
yet a de-prioritized uplink resource

703

Perform uplink transmission according to the specific type of
uplink resource

FIG. 7

METHOD FOR PROCESSING MULTIPLE RESOURCE CONFLICTS AND TERMINAL DEVICE

CROSS-REFERENCE TO RELATED APPLICATION

This application is a continuation of International Application No. PCT/CN2020/085997, filed Apr. 21, 2020, which is incorporated herein by reference in its entirety.

TECHNICAL FIELD

The present disclosure relates to the field of communications, and in particular, to a method for handling multiple resource conflicts and a terminal device.

BACKGROUND

5G Industrial interest of Things (IIoT) needs to support transmission of Factory automation, Transport Industry, Electrical Power Distribution and other services in the 5G system. Based on its transmission requirements of delay and reliability, IIoT introduces the concept of Time Sensitive Network (TSN) or Time Sensitive Communication (TSC). Therefore, the probability of conflict in time between resources configured for the same user is a problem that needs to be solved. The conflict includes a conflict between data channels, a conflict between a data channel and a control channel (or uplink control information (UCI)), and a conflict between a control channel (or UCI) and a control channel (or UCI). The UCI may be at least one of the following: a Scheduling request (SR), a Hybrid Automatic Repeat reQuest (HARQ) feedback, and a Channel State Information Reference signal (CSI-RS).

There is a case in which multiple resource conflicts exist in a resource conflict scenario. For example, resource A conflicts with resource B, and resource B conflicts with resource C. The resource may be a Physical Uplink Control Channel (PUCCH) or a Physical Uplink Shared Channel (PUSCH), which is not specifically limited. As shown in FIG. 1, it is a schematic diagram of a resource conflict scenario in the related art. As shown in FIG. 1, in terms of priority, L1>L2>L3. In the related art, if the L2 resource has data with higher priority subsequently, the resource priority becomes higher, such as higher than L1 and L3, but because the previous priority of L2 is low, the L2 resource can no longer be transmitted as a resource with high priority.

SUMMARY

Embodiments of the present disclosure provide a method for handling multiple resource conflicts and a terminal device, which are used to avoid unnecessary resource transmission blocking and ensure priority resource transmission.

In view of this, a first aspect of the embodiments of the present disclosure provides a method for handling multiple resource conflicts, which may include: when a medium access control (MAC) entity is configured with a target priority comparison manner, for each uplinkgrant; perform a priority comparison on the uplink grant with a compared resource.

Optionally, in some embodiments of the present disclosure, before performing the priority comparison of the uplink grant and the compared resource, the method further includes: initializing the uplink grant as a specific type of uplink resource.

Optionally, in some embodiments of the present disclosure, the performing the priority comparison on the uplink grant with the compared resource, includes: in a case of performing the priority comparison on the uplink grant with the compared resource, considering the uplink grant to be a specific type of uplink resource.

Optionally, in some embodiments of the present disclosure, the considering the uplink grant as a specific type of uplink resource in a case of performing the priority comparison on the uplink grant with the compared resource, includes: before performing the priority comparison on the uplink grant with the compared resource, considering the uplink grant to be the specific type of uplink resource; or, after performing the priority comparison on the uplink grant with the compared resource, considering the uplink grant to be the specific type of uplink resource.

Optionally, in some embodiments of the present disclosure, the specific type of uplink resource is a prioritized uplink resource or a de-prioritized uplink resource.

Optionally, in some embodiments of the present disclosure, the compared resource is not, or is not yet, a de-prioritized uplink resource.

Optionally, in some embodiments of the present disclosure, the performing the priority comparison on the uplink grant with the compared resource, includes:

if the uplink grant is an uplink grant scrambled by CS-RNTI with NDI=1, or scrambled by C-RNTI;

if PUSCH durations of the uplink grant and a first configured uplink grant do not overlap, wherein the first configured uplink grant and the uplink grant belong to a same BWP, and a priority of the first configured uplink grant is higher than a priority of the uplink grant; and, if the uplink grant does not overlap with a PUCCH resource of an SR transmission, wherein a priority of a logical channel that triggers the SR is higher than the priority of the uplink grant;

the uplink grant being a prioritized uplink grant;

if there is an overlapping uplink grant, the overlapping uplink grant being a de-prioritized uplink grant.

Optionally, in some embodiments of the present disclosure, at least one of the first configured uplink grant, the SR, and the PUCCH resource is not or is not yet a de-prioritized uplink resource.

Optionally, in some embodiments of the present disclosure, the performing the priority comparison on the uplink grant with the compared resource, includes:

if the uplink grant is a configured uplink grant;

if PUSCH durations of the uplink grant and a second configured uplink grant do not overlap, wherein the second configured uplink grant and the uplink grant belong to a same BWP, and a priority of the second configured uplink grant is higher than a priority of the uplink grant; and, if PUSCH durations of the uplink grant and a first target uplink grant do not overlap, wherein the first target uplink grant and the uplink grant belong to a same BWP, and a priority of the first target uplink grant is higher than or equal to the priority of the uplink grant, and the first target uplink grant is an uplink grant scrambled by CS-RNTI with NDI=1, or scrambled by C-RNTI; and, if the uplink grant does not overlap with a PUCCH resource of an SR transmission, wherein a priority of a logical channel that triggers the SR is higher than the priority of the uplink grant;

the uplink grant being a prioritized uplink grant;

if there is an overlapping uplink grant, the overlapping uplink grant being a de-prioritized uplink grant.

Optionally, in some embodiments of the present disclosure, at least one of the second configured uplink grant, the first target uplink grant, the SR, and the PUCCH resource is not or is not yet a de-prioritized uplink resource.

Optionally, in some embodiments of the present disclosure, the method further includes:

if a configuration of the SR or the PUCCH resource for transmitting the SR is the target priority comparison manner, and the SR or the PUCCH resource for transmitting the SR satisfies at least one of following conditions, considering the SR or the PUCCH resource for transmitting the SR to be a prioritized uplink resource:

it does not overlap with other uplink resource;

it overlaps with other uplink resource, and a priority of a logical channel that triggers the SR is higher than a priority of said other uplink resource;

it overlaps with other uplink resource, and a priority of the PUCCH resource for transmitting the SR is higher than the priority of said other uplink resource;

it overlaps with other uplink resource, the priority of the logical channel that triggers the SR is lower than or equal to the priority of said other uplink resource, and said other uplink resource is considered to be a de-prioritized uplink resource; and it overlaps with other uplink resource, the priority of the PUCCH resource for transmitting the SR is lower than or equal to the priority of said other uplink resource, and said other uplink resource is considered to be a pre-prioritized uplink resource.

Optionally, in some embodiments of the present disclosure, the method further includes:

if a configuration of the SR or the PUCCH resource for transmitting the SR is the target priority comparison manner, and the SR or the PUCCH resource for transmitting the SR satisfies at least one of following conditions, considering the SR or the PUCCH resource for transmitting the SR to be a pre-prioritized uplink resource:

it overlaps with other uplink resource, and a priority of a logical channel that triggers the SR is lower than or equal to a priority of said other uplink resource;

it overlaps with other uplink resource, and a priority of the PUCCH resource for transmitting the SR is lower than or equal to the priority of said other uplink resource;

it overlaps with other uplink resource, the priority of the logical channel that triggers the SR is lower than or equal to the priority of said other uplink resource, and said other uplink resource is not or is not considered to be a de-prioritized uplink resource; and it overlaps with other uplink resource, the priority of the PUCCH resource for transmitting the SR is lower than or equal to the priority of said other uplink resource, and said other uplink resource is not or is not yet a pre-prioritized uplink resource.

Optionally, in some embodiments of the present disclosure, the uplink grant comprises: an uplink grant that is not or is not yet a de-prioritized uplink grant; or, the uplink grant comprises: an uplink grant whose priority after update is higher than the priority before the update; or, the uplink grant comprises: an uplink grant that is not or is not yet a de-prioritized uplink grant, and an uplink grant whose priority after update is higher than the priority before the update.

Optionally, in some embodiments of the present disclosure, the priority of the uplink grant before the update is lower than a priority of a target uplink resource that conflicts with the uplink grant, and the priority of the uplink grant after the update is higher the priority of the target uplink resource.

Optionally, in some embodiments of the present disclosure, the method further includes: performing uplink transmission according to the specific type of uplink resource.

Optionally, in some embodiments of the present disclosure, the performing uplink transmission according to the specific type of uplink resource includes: if the specific type of uplink resource is a prioritized uplink resource, transmitting the specific type of uplink resource; and/or, if the specific type of uplink resource is a de-prioritized uplink resource, not transmitting the specific type of uplink resource.

Optionally, in some embodiments of the present disclosure, the target priority comparison manner includes: a logical channel-based priority comparison manner.

A second aspect of the embodiments of the present disclosure provides a terminal device, which has a function of avoiding unnecessary resource transmission blocking and ensuring priority resource transmission. This function can be implemented by hardware or by executing corresponding software by hardware. The hardware or software includes one or more modules corresponding to the above functions.

Another aspect of the embodiments of the present disclosure provides a terminal device, including: a memory storing executable program codes; a processor coupled to the memory; the processor calling the executable program codes stored in the memory, to execute the method described in the first aspect of the embodiments of the present disclosure.

Yet another aspect of the embodiments of the present disclosure provides a computer-readable storage medium, including instructions, which, when executed on a computer, cause the computer to perform the method described in the first aspect of the present disclosure.

Yet another aspect of the embodiments of the present disclosure provides a computer program product including instructions, which, when run on a computer, cause the computer to perform the method described in the first aspect of the present disclosure.

Yet another aspect of the embodiments of the present disclosure provides a chip, where the chip is coupled to a memory in the terminal device, so that the chip invokes program instructions stored in the memory when running, so that the terminal device executes the method described in the first aspect of the present disclosure.

The technical solutions provided by the embodiments of the present disclosure have the following beneficial effects.

In the embodiments of the present disclosure, when the medium access control (MAC) entity is configured with the target priority comparison manner, for each uplink grant; a priority comparison is performed on the uplink grant with a compared resource. Unnecessary resource transmission blocking is avoided and priority resource transmission is ensured.

BRIEF DESCRIPTION OF THE DRAWINGS

FIG. 3A is a schematic diagram of an embodiment of a method for handling multiple resource conflicts in an embodiment of the present disclosure;

FIG. 3B is a schematic diagram of another embodiment of a method for handling multiple resource conflicts in an embodiment of the present disclosure;

FIG. 6 is a schematic diagram of another embodiment of a method for handling multiple resource conflicts in an embodiment of the present disclosure;

FIG. 7 is a schematic diagram of another embodiment of a method for handling multiple resource conflicts in an embodiment of the present disclosure;

DETAILED DESCRIPTION

Figure 1:
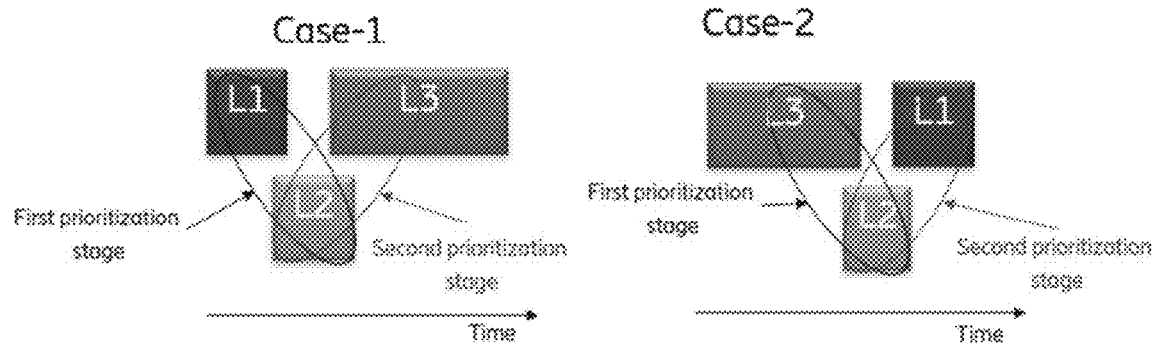
FIG. 1 is a schematic diagram of a resource conflict scenario in the related art.

The technical solutions in the embodiments of the present disclosure will be described below with reference to the drawings in the embodiments of the present disclosure. Obviously, the described embodiments are only a part of the embodiments of the present disclosure, rather than all the embodiments. Based on the embodiments of the present disclosure, all other embodiments obtained by those skilled in the art without creative efforts shall fall within the protection scope of the present disclosure.

It should be noted that, according to the agreement of the Radio Access Network (RAN) 2 #109e meeting, a resource that is considered to be a deprioritized resource (such as SR or uplink grant) cannot deprioritize other resource(s). That is, in combination with illustration of the above FIG. 1, if this agreement is followed, the priority of L2 is lower than that of L1, L2 will be considered as a deprioritized resource, then L2 should not deprioritize L3 resource. Then, according to such priority determining and processing result, the resources of L3 and L1 will be transmitted finally.

In the related art, the current RAN2 38.321 protocol is written as follows to determine whether the resource is a deprioritized resource, but it cannot reflect the above agreement.

When the Media Access Control (MAC) entity is configured with lch-basedPrioritization, for each uplink grant that is not already considered to be a de-prioritized uplink grant:

1> if this uplink grant is an uplink grant scrambled by Configured Scheduling Radio Network Temporary Identifier (CS-RNTI) with New data indication (NDI) =1, or scrambled by Cell Radio Network Temporary Identifier (C-RNTI):

2> if it does not overlap with a PUSCH duration of a configured uplink grant in the same Bandwidth Part (BWP) with a higher priority than this uplink grant; and, 2> if it does not overlap with a PUCCH resource of an SR transmission, where a priority of a logical channel that triggers the SR is higher than the priority of the uplink grant:

3> this uplink grant is a prioritized uplink grant;

3> if there is an overlapping uplink grant(s), the overlapping uplink grant(s) is a de-prioritized uplink grant.

1> if this uplink grant is a configured uplink grant:

2> if it does not overlap with a PUSCH duration of another configured uplink grant in the same BWP with a higher priority than this uplink grant; and, 2> if it does not overlap with a PUSCH duration of an uplink grant scrambled by CS-RNTI with NDI=1, or scrambled by C-RNTI, in the same BWP with a priority higher than or equal to this uplink grant; and, 2> if it does not overlap with a PUCCH resource of an SR transmission, where the priority of the logical channel that triggers the SR is higher than the priority of this uplink grant:

3> this uplink grant is a prioritized uplink grant;

3> if there is an overlapping uplink grant(s), the overlapping uplink grant(s) is a de-prioritized uplink grant.

It is understandable that the corresponding English translation is as follows:

When the MAC entity is configured, with lch-basedPrioritization, for each uplink grant which is not already a de-prioritized uplink grant:

1> if this uplink grant is addressed to CS-RNTI with NDI=1 or C-RNTI:

2> if there is no overlapping PUSCH duration of a configured uplink grant, in the same BWP whose priority is higher than the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

1> else if this uplink grant is a configured uplink grant:

2> if there is no overlapping PUSCH duration of another configured uplink grant, in the same BWP, whose priority is higher than the priority of the uplink grant; and 2> if there is no overlapping PUSCH duration of an uplink grant addressed to CS-RNTI with NDI=1 or C-RNTI, in the same BWP, whose priority is higher than or equal to the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

Combined with the RAN2 38.321 protocol and the above-mentioned illustration of FIG. 1, for some cases of resource conflict, such as case 2, some resources are not given/ identified as prioritized resources, such as L3. The terminal device cannot package the L3 resource for transmission. Moreover, even if the L2 resource is deprioritized, according to the condition in the existing protocol, even if it is considered to be a deprioritized resource, this deprioritized resource will still be used for comparison, and deprioritizes other resource (such as L3 resource).

Figure 2:
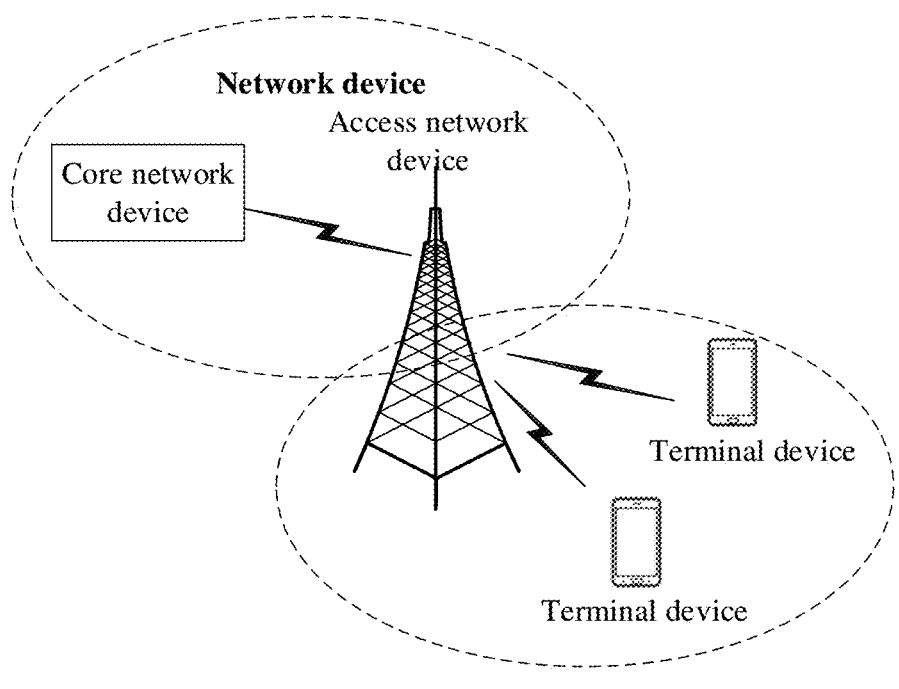
FIG. 2 is a system architecture diagram to which the embodiments of the present disclosure are applied.

As shown in FIG. 2, it is a system architecture diagram to which the embodiments of the present disclosure are applied. The system architecture may include a network device and a terminal device. The network device may further include an access network device and a core network device. That is, the wireless communication system further includes a plurality of core networks for communicating with the access network device. The access network device may be an evolutional node B (which may be referred to as eNB or e-NodeB for short), a macro base station, a micro base station (also called "small base station"), a pico base station, an access point (AP), a transmission point (TP) or a new generation Node B (gNodeB), etc. in the long-term evolution (LTE) system, the next-generation (mobile communication system) (next radio, NR) system, or the authorized auxiliary access long-term evolution (LAA-LTE) system.

The terminal device may be referred to as user equipment (UE), a mobile station (MS), a mobile terminal, an intelligent terminal device, etc., and the terminal device may communicate with one or more core networks via a radio access network (RAN). For example, the terminal device may be a mobile phone (or a "cellular" phone), a computer with a mobile terminal device, etc. The terminal device may also be a portable, pocket-sized, hand-held, computer-built-in or vehicle-mounted mobile device and a terminal device in a future NR network, which exchanges voice or data with the radio access network. Description of the terminal device: in the present disclosure, the terminal device may also include a Relay, and any device that may perform data communication with the base station may be regarded as the terminal device.

In the embodiments of the present disclosure, when the medium access control (MAC) entity is configured with a target priority comparison manner, for each uplink grant: a priority of the uplink grant is compared with that of a resource to be compared (a compared resource). Unnecessary resource transmission blocking is avoided, and transmission of prioritized resource is ensured.

As shown in FIG. 3A, it is a schematic diagram of an embodiment of a method for processing multiple resource conflicts in an embodiment of the present disclosure, which may include the following steps.

In 301A, when the medium access control (MAC) entity is configured with a target priority comparison manner, for each uplink grant.

Step 301A may be replaced by step 301B, and step 301B is: when the medium access control (MAC) entity is configured with the target priority comparison manner, for each uplink grant that is not or not yet a deprioritized uplink grant, or, for each of the uplink grant whose updated priority is higher than the priority before the update, or, for each uplink grant that is not or is not yet a deprioritized uplink grant and the updated priority of the uplink grant is higher than the priority before the update. As shown in FIG. 3B, it is a schematic diagram of an embodiment of a method for processing multiple resource conflicts in an embodiment of the present disclosure.

Optionally, in some embodiments of the present disclosure, the priority of the uplink grant before the update is lower than a priority of a target uplink resource that conflicts with the uplink grant, and the priority of the uplink grant after the update is higher than the priority of the target uplink resource. It should be noted that, the target uplink resource may be one or multiple, which is not specifically limited.

It can be understood that, "not or not yet" appearing in the embodiments of the present disclosure may also be expressed as "not considered to be or not yet considered to be". The target priority comparison manner may be a priority comparison manner based on a logical channel (Logical Channel-basedPrioritization, LCH-basedPrioritization) or a priority comparison manner based on a physical channel, which is not limited here. The following description takes the case where the MAC entity is configured with LCH-basedPrioritization as an example.

In 302, a priority comparison is performed on the uplink grant with a compared resource.

It can be understood that the compared resource is an uplink resource that overlaps or partially overlaps or has a transmission conflict with the uplink grant. The compared resource is not or is not yet a deprioritized uplink resource.

Optionally, before step 301A (or 301B) or 302, the terminal device may initialize the uplink grant as a specific type of uplink resource.

Optionally, the terminal device performs priority comparison on the uplink grant with the compared resource, which may include: in the case where the priority of the uplink grant is compared with that of the compared resource, considering that the uplink grant is the specific type of uplink resource.

Further, in the case where the priority of the uplink grant is compared with that of the compared resource, considering that the uplink grant is the specific type of the uplink resource, may include but not limited to the following implementation manners:

(1) before performing the priority comparison on the uplink grant with the compared resource, the uplink grant is considered to be the specific type of uplink resource; or, (2) after performing the priority comparison on the uplink grant with the compared resource, the uplink grant is considered to be the specific type of uplink resource. Based on this, after the priority comparison between the uplink grant and the compared resource is performed, if the uplink grant is not given or is not considered to be or has not been given a type, it is considered that the uplink grant is the specific type of uplink resource.

It can be understood that the specific type of uplink resource is a prioritized uplink resource or a deprioritized uplink resource. The preferred manner is considering it as the prioritized uplink resource.

Further, the priority comparison between the uplink grant and the compared resource may include but is not limited to the following situations:

(1) if the uplink grant is an uplink grant scrambled by CS-RNTI with NDI=1, or scrambled by C-RNTI;

if the PUSCH durations of the uplink grant and a first configured uplink grant do not overlap, where the first configured uplink grant and the uplink grant belong to the same BWP, and the priority of the first configured uplink grant is higher than that of the uplink grant; and, if the uplink grant does not overlap with the PUCCH resource of the SR transmission, where the priority of a logical channel that triggers the SR is higher than the priority of the uplink grant;

the uplink grant is a prioritized uplink grant;

if there is an overlapping uplink grant(s), the overlapping uplink grant(s) is a de-prioritized uplink grant.

Optionally, in this case, at least one of the first configured uplink grant, the SR, and the PUCCH resource is not or is not yet a de-prioritized uplink resource.

(2) if the uplink grant is a configured uplink grant;

if the PUSCH durations of the uplink grant and a second configured uplink grant do not overlap, where the second configured uplink grant and the uplink grant belong to the same BWP, and the priority of the second configured uplink grant is higher than that of the uplink grant; and, if the PUSCH durations of the uplink grant and a first target uplink grant do not overlap, where the first target uplink grant and the uplink grant belong to the same BWP, the priority of the first target uplink grant is higher than or equal to the priority of the uplink grant, and the first target uplink grant is an uplink grant scrambled by CS-RNTI with NDI=1, or scrambled by C-RNTI; and, if the uplink grant does not overlap with the PUCCH resource of the SR transmission, where the priority of the logical channel that triggers the SR is higher than the priority of the uplink grant;

the uplink grant is a prioritized uplink grant;

if there is an overlapping uplink grant(s), the overlapping uplink grant(s) is a de-prioritized uplink grant.

Optionally, in this case, at least one of the second configured uplink grant, the first target uplink grant, the SR, and the PUCCH resource is not or is not yet a de-prioritized uplink resource.

Exemplarily, when the MAC entity is configured with LCH-basedPrioritization, for each uplink grant; or, when the MAC entity is configured with LCH-basedPrioritization, for each uplink grant that has not been considered as a de-prioritized uplink grant, or, for each uplink grant whose priority becomes higher than the priority of its overlapping uplink grant(s), or, for each uplink grant that has not been considered as a de-prioritized uplink grant and the priority of that uplink grant becomes higher than the priority of its overlapping uplink grant(s):

1> if this uplink grant is scrambled by CS-RNTI with NDI=1, or scrambled by C-RNTI:

2> if it does not overlap with the PUSCH duration of a configured uplink grant in the same BWP with a higher priority than this uplink grant; and, 2> if it does not overlap with the PUCCH resource of an SR transmission, where the priority of the logical channel that triggers the SR is higher than the priority of the uplink grant:

3> this uplink grant is a prioritized uplink grant;

3> if there is an overlapping uplink grant(s), the overlapping uplink grant(s) is a de-prioritized uplink grant.

1> if this uplink grant is a configured uplink grant:

2> if it does not overlap with the PUSCH duration of another configured uplink grant in the same BWP with a higher priority than this uplink grant; and, 2> if it does not overlap with the PUSCH duration of an uplink grant scrambled by CS-RNTI with NDI=1, or scrambled by C-RNTI, in the same BWP, with a priority higher than or equal to this uplink grant; and, 2> if it does not overlap with the PUCCH resource of an SR transmission, where the priority of the logical channel that triggers the SR is higher than the priority of the uplink grant:

3> this uplink grant is a prioritized uplink grant;

3> if there is an overlapping uplink grant(s), the overlapping uplink grant(s) is a de-prioritized uplink grant.

It is understandable that the corresponding English translation is:

When the MAC entity is configured, with lch-basedPrioritization, for each uplink grant, or, or each uplink grant which is not already a de-prioritized uplink grant or whose priority is changed higher than the overlapping uplink grant(s):

1> if this uplink grant is addressed to CS-RNTI with NDI=1 or C-RNTI:

2> if there is no overlapping PUSCH duration of a configured uplink grant, in the same BWP whose priority is higher than the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

1> else if this uplink grant is a configured uplink grant:

2> if there is no overlapping PUSCH duration of another configured uplink grant, in the same BWP, whose priority is higher than the priority of the uplink grant; and 2> if there is no overlapping PUSCH duration of an uplink grant addressed to CS-RNTI with NDI=1 or C-RNTI, in the same BWP, whose priority is higher than or equal to the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

Optionally, in some embodiments of the present disclosure, the description will be made below on whether the terminal device considers the SR or the PUCCH resource for transmitting the SR to be a prioritized uplink resource or a de-prioritized uplink resource. It is shown as follows.

(1) The terminal device considers the SR or the PUCCH resource for transmitting the SR as a prioritized uplink resource.

If the configuration for the SR or the PUCCH resource for transmitting the SR is the target priority comparison manner, and the SR or the PUCCH resource for transmitting the SR satisfies at least one of the following conditions, the SR or the PUCCH resource for transmitting the SR is considered to be a prioritized uplink resource:

condition 1: it does not overlap with other uplink resource; condition 2: it overlaps with other uplink resource, and the priority of the logical channel that triggers the SR is higher than the priority of other uplink resource; condition 3: it overlaps with other uplink resource, and the priority of the PUCCH resource for transmitting the SR is higher than the priority of other uplink resource; condition 4: it overlaps with other uplink resource, the priority of the logical channel that triggers the SR is lower than or equal to the priority of other uplink resource, and other uplink resource is considered to be a de-prioritized uplink resource; and, condition 5: it overlaps with other uplink resource, the priority of the PUCCH resource for transmitting the SR is lower than or equal to the priority of other uplink resource, and said other uplink resource is considered to be a de-prioritized uplink resource.

(2) The terminal device considers the SR or the PUCCH resource for transmitting the SR as a de-prioritized uplink resource.

If the configuration for the SR or the PUCCH resource for transmitting the SR is the target priority comparison manner, and the SR or the PUCCH resource for transmitting the SR satisfies at least one of the following conditions, the SR or the PUCCH resource for transmitting the SR is considered to be a pre-prioritized uplink resource:

condition 1: it overlaps with other uplink resource, and the priority of the logical channel that triggers the SR is lower than or equal to the priority of other uplink resource; condition 2: it overlaps with other uplink resource, and the priority of the PUCCH resource for transmitting the SR is lower than or equal to the priority of other uplink resource; condition 3: it overlaps with other uplink resource, and the priority of the logical channel that triggers the SR is lower than or equal to the priority of other uplink resource, and said other uplink resource is not or is not considered to be a pre-prioritized uplink resource; and, condition 4: it overlaps with other uplink resource, the priority of the PUCCH resource transmitting the SR is lower than or equal to the priority of other uplink resource, and said other uplink resource is not or not yet a pre-prioritized uplink resource.

Optionally, the configuration for the SR or the PUCCH resource for transmitting the SR is the target priority comparison manner, where the target priority comparison manner may be a logical channel-based priority comparison manner.

In 303, uplink transmission is performed according to a specific type of uplink resource.

The terminal device performs uplink transmission according to the specific type of uplink resource, which may include but is not limited to the following transmission modes: if the specific type of uplink resource is a prioritized uplink resource, transmitting the specific type of uplink resource; and/or, if the specific type of uplink resource is a pre-prioritized uplink resource, not transmitting the specific type of uplink resource. It should be noted that step 303 is an optional step.

In the embodiments of the present disclosure, when the medium access control (MAC) entity is configured with the target priority comparison manner, for each uplink grant. Priority comparison is performed on the uplink grant with the compared resource. That is, the condition for the compared resource to enter the comparison determination is removed, or the condition for the compared resource to enter the comparison determination is added, so as to ensure a change in the resource comparison result due to the subsequent priority change of the compared resource, such as becoming higher (for example, because the data of the LCH with a higher priority arrives in the LCH that may be carried on the compared resource K, the priority of the compared resource K becomes higher, and is higher than other resource(s) conflicted with the compared resource K), which can ensure that after the priority of the compared resource K becomes higher, data with higher priority can be transmitted.

Figures 4, 5:
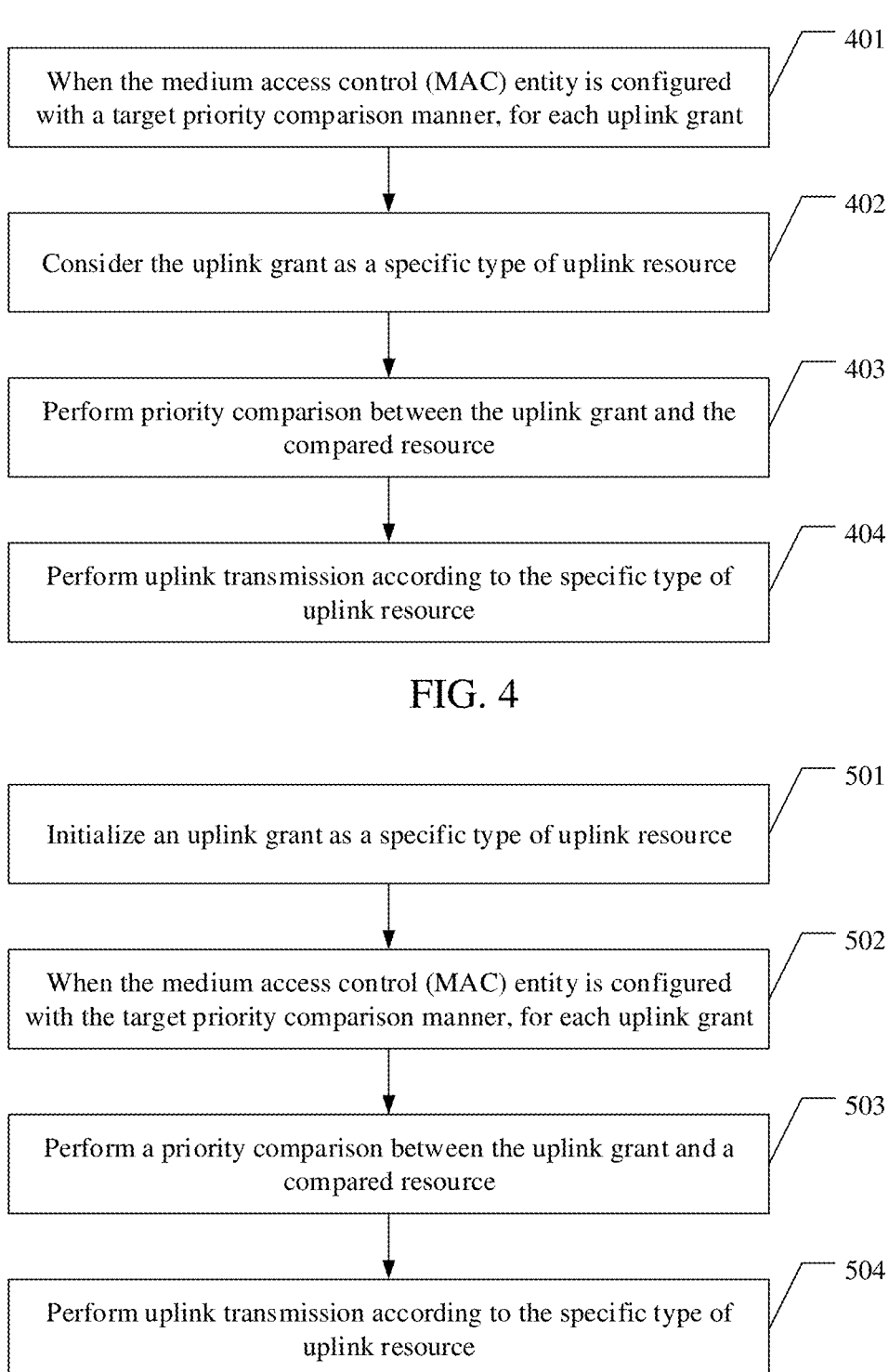
FIG. 4 is a schematic diagram of another embodiment of a method for handling multiple resource conflicts in an embodiment of the present disclosure.
FIG. 5 is a schematic diagram of another embodiment of a method for handling multiple resource conflicts in an embodiment of the present disclosure.

As shown in FIG. 4, it is a schematic diagram of another embodiment of the method for processing multiple resource conflicts in the embodiment of the present disclosure, which may include the following steps.

In 401, when the medium access control (MAC) entity is configured with a target priority comparison manner, for each uplink grant.

Optionally, in some embodiments of the present disclosure, the uplink grant is not or is not yet a de-prioritized uplink grant; or, the priority of the uplink grant after update is higher than the priority before the update; or, the uplink grant is not or is not yet a de-prioritized uplink grant, and the priority of the uplink grant after update is higher than the priority before the update.

It can be understood that, "not or not yet" appearing in the embodiments of the present disclosure may also be expressed as "not considered to be or not yet considered to be". The target priority comparison manner may be LCH-basedPrioritization or physical channel-based priority comparison manner, which is not limited here. The following description takes the case where the MAC entity is configured with LCH-basedPrioritization as an example.

Optionally, in some embodiments of the present disclosure, the priority of the uplink grant before the update is lower than the priority of the target uplink resource that conflicts with the uplink grant, and the priority of the uplink grant after the update is higher than the priority of the target uplink resource. It should be noted that, the target uplink resource may be one or multiple, which is not specifically limited.

In 402, the uplink grant is considered as a specific type of uplink resource.

Before the terminal device compares the priority of the uplink grant with the compared resource, the terminal device considers the uplink grant to be the specific type of uplink resource. It can be understood that the specific type of uplink resource is a prioritized uplink resource or a pre-prioritized uplink resource. Among them, the preferred manner is considering it as the prioritized uplink resource.

In 403, priority comparison is performed between the uplink grant and the compared resource.

It can be understood that the compared resource is an uplink resource that overlaps or partially overlaps or conflicts with the uplink grant. Further, the compared resource is not or not yet a pre-prioritized uplink resource.

Further, for priority comparison between the uplink grant and the compared resource, reference may be made to the description in step 302 in FIG. 3A or FIG. 3B, which will not be repeated here.

Exemplarily, the description is given by taking each uplink grant that has not been considered as a pre-prioritized uplink grant as an example.

When the MAC entity is configured with LCH-basedPrioritization, for each uplink grant that has not yet been considered to be a pre-prioritized uplink grant:

this uplink grant is considered to be a prioritized uplink resource;

1> if this uplink grant is scrambled by CS-RNTI with NDI=1, or scrambled by C-RNTI:

2> if it does not overlap with the PUSCH duration of a configured uplink grant in the same BWP with a higher priority than this uplink grant; and, 2> if it is does not overlap with the PUCCH resource of an SR transmission, where the priority of the logical channel that triggers the SR is higher than the priority of the uplink grant:

3> this uplink grant is a prioritized uplink grant;

3> if there is an overlapping uplink grant(s), the overlapping uplink grant(s) is a pre-prioritized uplink grant.

1> if this uplink grant is a configured uplink grant:

2> if it does not overlap with the PUSCH duration of another configured uplink grant in the same BWP with a higher priority than this uplink grant; and, 2> if it does not overlap with the PUSCH duration of an uplink grant scrambled by CS-RNTI with NDI=1, or scrambled by C-RNTI, in the same BWP, with a priority higher than or equal to this uplink grant; and, 2> if it does not overlap with the PUCCH resource of an SR transmission, where the priority of the logical channel that triggers the SR is higher than the priority of the uplink grant:

3> this uplink grant is a prioritized uplink grant;

3> if there is overlapping uplink grant(s), the overlapping uplink grant(s) is a pre-prioritized uplink grant.

It is understandable that the corresponding English translation is:

When the MAC entity is configured, with lch-basedPrioritization, for each uplink grant which is not already a de-prioritized uplink grant:

consider this uplink grant is a prioritized uplink grant;

1> if this uplink grant is addressed to CS-RNTI with NDI=1 or C-RNTI:

2> if there is no overlapping PUSCH duration of a configured uplink grant, in the same BWP whose priority is higher than the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

1> else if this uplink grant is a configured uplink grant:

2> if there is no overlapping PUSCH duration of another configured uplink grant, in the same BWP, whose priority is higher than the priority of the uplink grant; and 2> if there is no overlapping PUSCH duration of an uplink grant addressed to CS-RNTI with NDI=1 or C-RNTI, in the same BWP, whose priority is higher than or equal to the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

Optionally, in some embodiments of the present disclosure, for the explanation on whether the terminal device considers the SR or the PUCCH resource for transmitting the SR to be a prioritized uplink resource or a pre-prioritized uplink resource, the description in step 302 in FIG. 3A or FIG. 3B is referred to, which is not repeated here.

In 404, uplink transmission is performed according to the specific type of uplink resource.

It should be noted that, for step 404, reference may be made to step 303 described in FIG. 3A or FIG. 3B, which will not be repeated here, and step 404 is an optional step.

In the embodiments of the present disclosure, when the medium access control (MAC) entity is configured with a target priority comparison manner, for each uplink grant; the uplink grant is considered to be a specific type of uplink resource; priority comparison is performed on the uplink grant with the compared resource. That is, for each uplink grant, it is considered as a specific type of uplink resource before performing the resource priority comparison. Further, the specific type of uplink resource may be a prioritized uplink resource or a deprioritized uplink resource.

As shown in FIG. 5, it is a schematic diagram of another embodiment of the method for processing multiple resource conflicts in the embodiment of the present disclosure, which may include the following steps.

In 501, an uplink grant is initialized as a specific type of uplink resource.

When the medium access control (MAC) entity is configured with the target priority comparison method, for each uplink grant, it is considered that the uplink grant is initialized as a specific type of uplink resource.

Optionally, the uplink grant is not or is not yet a de-prioritized uplink grant; or, the priority of the uplink grant after update is higher than the priority before the update; or, the uplink grant is not or is not yet a de-prioritized uplink grant, and the priority of the uplink grant after update is higher than the priority before the update.

It can be understood that, "not yet or not yet" appearing in the embodiments of the present disclosure may also be expressed as "not considered to be or not yet considered to be".

In 502, when the medium access control (MAC) entity is configured with the target priority comparison manner, for each uplink grant.

The target priority comparison manner may be LCH-basedPrioritization or a physical channel-based priority comparison manner, which is not limited here. The following description takes the case where the MAC entity is configured with LCH-basedPrioritization as an example.

Optionally, in some embodiments of the present disclosure, the priority before the update of the uplink grant is lower than the priority of the target uplink resource that conflicts with the uplink grant, and the priority after the update of the uplink grant is higher than the priority of the target uplink resource. It should be noted that, the target uplink resource may be one or multiple, which is not specifically limited.

In 503, a priority comparison is performed between the uplink grant and a compared resource.

It can be understood that the compared resource is an uplink resource that overlaps or partially overlaps with the uplink grant or has a transmission conflict with the uplink grant. Further, the compared resource is not or is not yet a de-prioritized uplink resource.

Further, for priority comparison between the uplink grant and the compared resource, reference may be made to the description in step 302 in FIG. 3A or FIG. 3B, which will not be repeated here.

Exemplarily, description is given by taking each uplink grant that has not been considered as a de-prioritized uplink grant as an example.

When the MAC entity is configured with LCH-basedPrioritization, for each uplink grant, the uplink grant is initially considered as a prioritized uplink grant;

when the MAC entity is configured with LCH-basedPrioritization, for each uplink grant that has not yet been considered to be a de-prioritized uplink grant:

1> if this uplink grant is scrambled by CS-RNTI with NDI=1, or scrambled by C-RNTI:

2> if it does not overlap with the PUSCH duration of a configured uplink grant in the same BWP with a higher priority than this uplink grant; and, 2> if it does not overlap with the PUCCH resource of an SR transmission, where the priority of the logical channel that triggers the SR is higher than the priority of the uplink grant:

3> this uplink grant is a prioritized uplink grant;

3> if there is an overlapping uplink grant, the overlapping uplink grant is a de-prioritized uplink grant.

1> if this uplink grant is a configured uplink grant:

2> if it does not overlap with the PUSCH duration of another configured uplink grant in the same BWP with a higher priority than this uplink grant; and, 2> if it does not overlap with the PUSCH duration of an uplink grant scrambled by CS-RNTI with NDI=1, or scrambled by C-RNTI, with a priority higher than or equal to this uplink grant in the same BWP; and, 2> if it does not overlap with the PUCCH resource of an SR transmission, where the priority of the logical channel that triggers the SR is higher than the priority of the uplink grant:

3> this uplink grant is a prioritized uplink grant;

3> if there is an overlapping uplink grant, the overlapping uplink grant is a pre-prioritized uplink grant.

It is understandable that the corresponding English translation is:

When the MAC entity is configured, with lch-basedPrioritization, for each uplink grant, the uplink grant is initialized considered as a prioritized uplink grant.

When the MAC entity is configured, with lch-basedPrioritization, for each uplink grant which is not already a de-prioritized uplink grant:

1> if this uplink grant is addressed to CS-RNTI with NDI=1 or C-RNTI:

2> if there is no overlapping PUSCH duration of a configured uplink grant, in the same BWP whose priority is higher than the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

1> else if this uplink grant is a configured uplink grant:

2> if there is no overlapping PUSCH duration of another configured uplink grant, in the same BWP, whose priority is higher than the priority of the uplink grant; and 2> if there is no overlapping PUSCH duration of an uplink grant addressed to CS-RNTI with NDI=1 or C-RNTI, in the same BWP, whose priority is higher than or equal to the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

Optionally, in some embodiments of the present disclosure, for the explanation on whether the terminal device considers the SR or the PUCCH resource that transmits the SR to be a prioritized uplink resource or a de-prioritized uplink resource, description in step 302 in FIG. 3A or FIG. 3B may be referred to, which is not repeated here.

In 504, uplink transmission is performed according to the specific type of uplink resource.

It should be noted that, for step 504, reference may be made to step 303 described in FIG. 3A or FIG. 3B, which will not be repeated here, and step 504 is an optional step.

In the embodiments of the present disclosure, when the medium access control (MAC) entity is configured with a target priority comparison manner, for each uplink grant; the uplink grant is considered to be a specific type of uplink resource; the priority of the uplink grant is compared with the priority of the compared resource. That is, for each uplink grant, it is considered as a specific type of uplink resource before the resource priority comparison is made.

Further, the specific type of uplink resource may be a prioritized uplink resource or a de-prioritized uplink resource.

As shown in FIG. 6, it is a schematic diagram of another embodiment of the method for processing multiple resource conflicts in the embodiment of the present disclosure, which may include the following steps.

In 601, when the medium access control (MAC) entity is configured with a target priority comparison manner, for each uplink grant.

Optionally, in some embodiments of the present disclosure, the uplink grant is not or is not yet a de-prioritized uplink grant; or, the priority of the uplink grant after the update is higher than the priority before the update; or, the uplink grant is not or is not yet a de-prioritized uplink grant, and the priority of the uplink grant after update is higher than the priority before the update.

It can be understood that, "not or not yet" appearing in the embodiments of the present disclosure may also be expressed as "not considered to be or not yet considered to be". The target priority comparison manner may be LCH-basedPrioritization or physical channel-based priority comparison manner, which is not limited here. The following description takes the case where the MAC entity is configured with LCH-basedPrioritization as an example.

Optionally, in some embodiments of the present disclosure, the priority of the uplink grant before the update is lower than the priority of the target uplink resource that conflicts with the uplink grant, and the priority of the uplink grant after the update is higher than the priority of the target uplink resource. It should be noted that, the target uplink resource may be one or multiple, which is not specifically limited.

In 602, priority comparison is performed between the uplink grant and the compared resource.

It can be understood that the compared resource is an uplink resource that overlaps or partially overlaps or has a transmission conflict with the uplink grant. Further, the compared resource is not or is not yet a de-prioritized uplink resource.

Further, for the priority comparison between the uplink grant and the compared resource, reference may be made to the description in step 302 in FIG. 3A or FIG. 3B, which will not be repeated here.

In 603, the uplink grant is considered to be a specific type of uplink resource.

Based on this, after the priority of the uplink grant is compared with the priority of the compared resource, if the uplink grant is not given or is not considered or has not been given a type, the terminal device considers that the uplink grant is the specific type of uplink resource. It can be understood that the specific type of uplink resource is a prioritized uplink resource or a de-prioritized uplink resource. Among them, the preferred mode is considering it as the prioritized uplink resource.

Exemplarily, each uplink grant that has not been considered as a de-prioritized uplink grant is taken as an example for description:

when the MAC entity is configured with LCH-basedPrioritization, for each uplink grant that has not yet been considered a de-prioritized uplink grant:

1> if this uplink grant is scrambled by CS-RNTI with NDI=1, or scrambled by

2> if it does not overlap with the PUSCH duration of a configured uplink grant in the same BWP with a higher priority than this uplink grant; and, 2> if it does not overlap with the PUCCH resource of an SR transmission, where the priority of the logical channel that triggers the SR is higher than the priority of the uplink grant:

3> this uplink grant is a prioritized uplink grant;

3> if there is an overlapping uplink grant, the overlapping uplink grant is a de-prioritized uplink grant.

1> if this uplink grant is a configured uplink grant:

2> if it does not overlap with the PUSCH duration of another configured uplink grant in the same BWP with a higher priority than this uplink grant; and, 2> if it does not overlap with the PUSCH duration of an uplink grant scrambled by CS-RNTI with NDI=1, or scrambled by C-RNTI, with a priority higher than or equal to this uplink grant in the same BWP; and, 2> if it does not overlap with the PUCCH resource of an SR transmission, where the priority of the logical channel that triggers the SR is higher than the priority of the uplink grant:

3> this uplink grant is a prioritized uplink grant;

3> if there is an overlapping uplink grant, the overlapping uplink grant is a de-prioritized uplink grant.

When the MAC entity is configured with LCH-basedPrioritization, for each uplink grant, if it has not been considered as a prioritized resource or a de-prioritized resource, the uplink grant is considered as a prioritized uplink resource.

It is understandable that the corresponding English translation is:

When the MAC entity is configured, with lch-basedPrioritization, for each uplink grant which is not already a de-prioritized uplink grant:

1> if this uplink grant is addressed to CS-RNTI with NDI=1 or C-RNTI:

2> if there is no overlapping PUSCH duration of a configured uplink grant, in the same BWP whose priority is higher than the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

1> else if this uplink grant is a configured uplink grant:

2> if there is no overlapping PUSCH duration of another configured uplink grant, in the same BWP, whose priority is higher than the priority of the uplink grant; and 2> if there is no overlapping PUSCH duration of an uplink grant addressed to CS-RNTI with NDI=1 or C-RNTI, in the same BWP, whose priority is higher than or equal to the priority of the uplink grant; and 2> if there is no overlapping PUCCH resource with an SR transmission where the priority of the logical channel that triggered the SR is higher than the priority of the uplink grant:

3> this uplink grant is a prioritized uplink grant;

3> the other overlapping uplink grant(s), if any, is a de-prioritized uplink grant.

When the MAC entity is configured, with lch-basedPrioritization, for each uplink grant, the uplink grant is considered as a prioritized uplink grant if it has not been prioritized or de-prioritized.

Optionally, in some embodiments of the present disclosure, for the explanation on whether the terminal device considers the SR or the PUCCH resource that transmits the SR to be a prioritized uplink resource or a de-prioritized uplink resource, the description in step 302 in FIG. 3A or FIG. 3B may be referred to, which is not repeated here.

In 604, uplink transmission is performed according to the specific type of uplink resource.

It should be noted that, for step 604, reference may be made to step 303 described in FIG. 3A or FIG. 3B, which will not be repeated here, and step 604 is an optional step.

In the embodiments of the present disclosure, when the medium access control (MAC) entity is configured with a target priority comparison manner, for each uplink grant; the uplink grant is considered to be a specific type of uplink resource; and the priority of the uplink grant is compared with the priority of the compared resource. That is, for each uplink grant, after the resource priority is compared, the resource is not considered to be a prioritized uplink resource or a de-prioritized uplink resource, and the resource is considered to be a specific type of uplink resource. Further, the specific type of uplink resource may be a prioritized uplink resource or a de-prioritized uplink resource.

As shown in FIG. 7, it is a schematic diagram of another embodiment of the method for processing multiple resource conflicts in the embodiment of the present disclosure, which may include the following steps.

In 701, when the medium access control (MAC) entity is configured with the target priority comparison manner, for each uplink grant.

Optionally, in some embodiments of the present disclosure, the uplink grant is not or is not yet a de-prioritized uplink grant; or, the priority of the uplink grant after the update is higher than the priority before the update; or, the uplink grant is not or is not yet a de-prioritized uplink grant, and the priority of the uplink grant after the update is higher than the priority before the update.

It can be understood that, "not yet or not yet" appearing in the embodiments of the present disclosure may also be expressed as "not considered to be or not yet considered to be". The target priority comparison manner may be LCH-basedPrioritization or physical channel-based priority comparison manner, which is not limited here. The following description takes the case where the MAC entity is configured with LCH-basedPrioritization as an example.

Optionally, in some embodiments of the present disclosure, the priority of the uplink grant before the update is lower than the priority of the target uplink resource that conflicts with the uplink grant, and the priority of the uplink grant after the update is higher than the priority of the target uplink resource. It should be noted that, the target uplink resource may be one or multiple, which is not specifically limited.

In 702, the priority of the uplink grant is compared with the priority of the compared resource, where the compared resource is not or is not yet a de-prioritized uplink resource.

It can be understood that the compared resource is an uplink resource that overlaps or partially overlaps or has a transmission conflict with the uplink grant.

Optionally, before step 701 or 702, the terminal device may initialize the uplink grant to a specific type of uplink resource.

Optionally, the terminal device compares the priority of the uplink grant with the priority of the compared resource, which may include: in the case where the priority of the uplink grant is compared with the priority of the compared resource, considering the uplink grant to be a specific type of uplink resource.

Further, in the case where the priority of the uplink grant is compared with the priority of the compared resource, it is considered that the uplink grant is the specific type of the uplink resource, which may include but not limited to the following implementation manners:

(1) before the priority comparison between the uplink grant and the compared resource is performed, the uplink grant is considered to be the specific type of uplink resource; or, (2) after the priority comparison between the uplink grant and the compared resource is performed, the uplink grant is considered to be the specific type of uplink resource.

It can be understood that the specific type of uplink resource is a prioritized uplink resource or a de-prioritized uplink resource. Among them, the preferred mode is considering it as the prioritized uplink resource.

Further, the priority comparison between the uplink grant and the compared resource may include but is not limited to the following situations:

(1) if the uplink grant is an uplink grant scrambled by CS-RNTI with NDI=1, or scrambled by C-RNTI;

if the PUSCH durations of the uplink grant and the first configured uplink grant do not overlap, where the first configured uplink grant and the uplink grant belong to the same BWP, and the priority of the first configured uplink grant is higher than that of the uplink grant; and, if the uplink grant does not overlap with the PUCCH resource of an SR transmission, where the priority of the logical channel that triggers the SR is higher than the priority of the uplink grant;

the uplink grant is a prioritized uplink grant;

if there is an overlapping uplink grant, the overlapping uplink grant is a de-prioritized uplink grant;

where at least one of the first configured uplink grant, the SR, and the PUCCH resource is not or is not yet a pre-prioritized uplink resource.

(2) if the uplink grant is a configured uplink grant;

if the PUSCH durations of the uplink grant and a second configured uplink grant do not overlap, where the second configured uplink grant and the uplink grant belong to the same BWP, and the priority of the second configured uplink grant is higher than that of the uplink grant; and, if the PUSCH durations of the uplink grant and the first target uplink grant do not overlap, where the first target uplink grant and the uplink grant belong to the same BWP, the priority of the first target uplink grant is higher than or equal to the priority of the uplink grant, and the first target uplink grant is an uplink grant scrambled by CS-RNTI with NDI=1, or scrambled by C-RNTI; and, if the uplink grant does not overlap with the PUCCH resource of an SR transmission, where the priority of the logical channel that triggers the SR is higher than the priority of the uplink grant;

the uplink grant is a prioritized uplink grant;

if there is an overlapping uplink grant, the overlapping uplink grant is a de-prioritized uplink grant;

where at least one of the second configured uplink grant, the first target uplink grant, the SR, and the PUCCH resource is not or is not yet a de-prioritized uplink resource.

Exemplarily, each uplink grant that has not been considered as a de-prioritized is taken as an example for description:

when the MAC entity is configured with lch-basedPrioritization, for each uplink grant that has not yet been considered to be a pre-prioritized uplink grant:

1> if this uplink grant is scrambled by CS-RNTI with NDI=1, or scrambled by C-RNTI:

2> if it does not overlap with the PUSCH duration of a configured uplink grant in the same BWP with a priority higher than this uplink grant, and this configured grant is not yet a pre-prioritized uplink resource; and, 2> if it does not overlap with the PUCCH resource of an SR transmission, where the priority of the logical channel that triggers the SR is higher than the priority of the uplink grant, and the PUCCH resource is not yet a pre-prioritized resource:

3> this uplink grant is a prioritized uplink grant;

3> if there is an overlapping uplink grant(s), the overlapping uplink grant(s) is a de-prioritized uplink grant.

1> if this uplink grant is a configured uplink grant:

2> if it does not overlap with the PUSCH duration of another configured uplink grant in the same BWP with a higher priority than this uplink grant, and said another configured grant is not yet a pre-prioritized uplink resource; and, 2> if it does not overlap with the PUSCH duration of an uplink resource scrambled by CS-RNTI with NDI=1, or scrambled by C-RNTI, with a priority higher than or equal to this uplink grant in the same BWP, and this overlapping uplink resource is not yet a pre-prioritized uplink resource; and, 2> if it does not overlap with the PUCCH resource of an SR transmission, where the priority of the logical channel that triggers the SR is higher than the priority of the uplink grant, and the PUCCH resource is not a pre-prioritized resource:

3> this uplink grant is a prioritized uplink grant;

3> if there is an overlapping uplink grant, the overlapping uplink grant is a de-prioritized uplink grant.

It is understandable that the corresponding English translation is:

When the MAC entity is configured, with lch-basedPrioritization, for each uplink grant which is not already a de-prioritized uplink grant:

1> if this uplink grant is addressed to CS-RNTI with NDI=1 or C-RNTI:

2> if there is no overlapping PUSCH duration of a configured uplink grant which is not a de-prioritized uplink grant, in the same BWP, and the priority of the overlapping configured uplink grant is higher than the priority of the uplink grant; and 2> if there is no overlapping PUCCH resource with an SR transmission where the priority of the logical channel that triggered the SR is higher than the priority of the uplink grant, and the overlapping PUCCH resource with an SR transmission is not de-prioritized:

3> this uplink grant is a prioritized uplink grant;

3> the other overlapping uplink grant(s), if any, is a de-prioritized uplink grant.

1> else if this uplink grant is a configured uplink grant:

2> if there is no overlapping PUSCH duration of another configured uplink grant which is not a de-prioritized uplink grant, in the same BWP, and the priority of the overlapping configured uplink grant is higher than the priority of the uplink grant; and 2> if there is no overlapping PUSCH duration of an uplink grant addressed to CS-RNTI with NDI=1 or C-RNTI, which is not a de-prioritized uplink grant in the same BWP, and the priority of the overlapping uplink grant is higher than or equal to the priority of the uplink grant; and 2> if there is no overlapping PUCCH resource with an SR transmission where the priority of the logical channel that triggered the SR is higher than the priority of the uplink grant, and the overlapping PUCCH resource with an SR transmission is not de-prioritized:

3> this uplink grant is a prioritized uplink grant;

3> the other overlapping uplink grant(s), if any, is a de-prioritized uplink grant.

Optionally, in some embodiments of the present disclosure, the description will be made below on whether the terminal device considers the SR or the PUCCH resource for transmitting the SR to be a prioritized uplink resource or a pre-prioritized uplink resource, which is as follows.

(1) The terminal device considers the SR or the PUCCH resource that transmits the SR as a prioritized uplink resource.

If the configuration for the SR or the PUCCH resource for transmitting the SR is the target priority comparison manner, and the SR or the PUCCH resource for transmitting the SR satisfies at least one of the following conditions, the SR or the PUCCH resource for transmitting the SR is considered to be a prioritized uplink resource:

condition 1: it does not overlap with other uplink resource; condition 2: it overlaps with other uplink resource, and the priority of the logical channel that triggers the SR is higher than the priority of other uplink resource; condition 3: it overlaps with other uplink resource, and the priority of the PUCCH resource for transmitting the SR is higher than the priority of other uplink resource; condition 4: it overlaps with other uplink resource, the priority of the logical channel that triggers the SR is lower than or equal to the priority of other uplink resource, and said other uplink resource is considered to be a pre-prioritized uplink resource; and, condition 5: it overlaps with other uplink resource, the priority of the PUCCH resource for transmitting the SR is lower than or equal to the priority of other uplink resource, and said other uplink resource is considered to be a pre-prioritized uplink resource.

(2) The terminal device considers the SR or the PUCCH resource for transmitting the SR as a pre-prioritized uplink resource.

If the configuration for the SR or the PUCCH resource for transmitting the SR is the target priority comparison manner, and the SR or the PUCCH resource for transmitting the SR satisfies at least one of the following conditions, the SR or the PUCCH resource for transmitting the SR is considered to be a pre-prioritized uplink resource:

condition 1: it overlaps with other uplink resource, and the priority of the logical channel that triggers the SR is lower than or equal to the priority of other uplink resource; condition 2: it overlaps with other uplink resource, and the priority of the PUCCH resource for transmitting the SR is lower than or equal to the priority of other uplink resource; condition 3: it overlaps with other uplink resource, the priority of the logical channel that triggers the SR is lower than or equal to the priority of other uplink resource, and said other uplink resource is not or is not considered to be a pre-prioritized uplink resource; and, condition 4: it overlaps with other uplink resource, the priority of the PUCCH resource transmitting the SR is lower than or equal to the priority of other uplink resource, and said other uplink resource is not or is not yet a pre-prioritized uplink resource.

Optionally, the configuration for the SR or the PUCCH resource for transmitting the SR is the target priority comparison manner, where the target priority comparison manner may be a logical channel-based priority comparison manner.

In 703, uplink transmission is performed according to the specific type of uplink resource.

It should be noted that, for step 703, reference may be made to step 303 described in FIG. 3A or FIG. 3B, which will not be repeated here, and step 703 is an optional step.

In the embodiments of the present disclosure, when the resource priority comparison is performed, the compared resource is only compared with the resource that is not considered to be a de-prioritized resource. The compared resource includes a UL resource. For example, resource A does not overlap with a resource that has a higher priority than resource A and is not yet considered to be a de-prioritized resource. Resource A is a prioritized resource, and other resources overlapping with resource A are de-prioritized resources.

Figure 8:
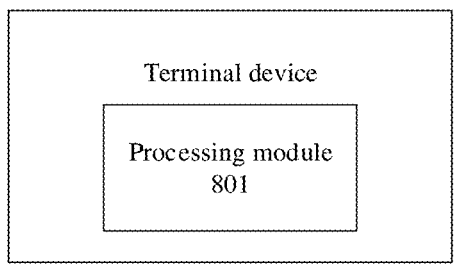
FIG. 8 is a schematic diagram of an embodiment of a terminal device in an embodiment of the present disclosure.

As shown in FIG. 8, it is a schematic diagram of an embodiment of a terminal device in an embodiment of the present disclosure, which may include:

a processing module 801, configured to, when the medium access control (MAC) entity is configured with a target priority comparison manner, for each uplink grant;

perform a priority comparison on the uplink grant with a compared resource.

Optionally, in some embodiments of the present disclosure, the processing module 801 is further configured to initialize the uplink grant as a specific type of uplink resource.

Optionally, in some embodiments of the present disclosure, the processing module 801 is specifically configured to consider the uplink grant to be a specific type of uplink resource when performing the priority comparison on the uplink grant with the compared resource.

Optionally, in some embodiments of the present disclosure, the processing module 801 is specifically configured to consider that the uplink grant is the specific type of uplink resource before the priority comparison is performed between the uplink grant and the compared resource; or, the processing module 801 is specifically configured to consider that the uplink grant is the specific type of uplink resource after the priority comparison is performed between the uplink grant and the compared resource.

Optionally, in some embodiments of the present disclosure, the specific type of uplink resource is a prioritized uplink resource or a de-prioritized uplink resource.

Optionally, in some embodiments of the present disclosure, the compared resource is not or is not yet a pre-prioritized uplink resource.

Optionally, in some embodiments of the present disclosure, the processing module 801 is specifically configured to:

if the uplink grant is an uplink grant scrambled by CS-RNTI with NDI=1, or scrambled by C-RNTI;

if PUSCH durations of the uplink grant and a first configured uplink grant do not overlap, where the first configured uplink grant and the uplink grant belong to the same BWP, and the first configured uplink grant has a higher priority than the priority of the uplink grant; and, if the uplink grant does not overlap with the PUCCH resource of an SR transmission, where the priority of the logical channel that triggers the SR is higher than the priority of the uplink grant;

the uplink grant is a prioritized uplink grant;

if there is an overlapping uplink grant(s), the overlapping uplink grant(s) is a de-prioritized uplink grant.

Optionally, in some embodiments of the present disclosure, at least one of the first configured uplink grant, the SR, and the PUCCH resource is not or is not yet a de-prioritized uplink resource.

Optionally, in some embodiments of the present disclosure, the processing module 801 is specifically configured to:

if the uplink grant is a configured uplink grant;

if the PUSCH durations of the uplink grant and a second configured uplink grant do not overlap, where the second configured uplink grant and the uplink grant belong to the same BWP, and the priority of the second configured uplink grant is higher than that of the uplink grant; and, if the PUSCH durations of the uplink grant and a first target uplink grant do not overlap, where the first target uplink grant and the uplink grant belong to the same BWP, the priority of the first target uplink grant is higher than or equal to the priority of the uplink grant, and the first target uplink grant is an uplink grant scrambled by CS-RNTI with NDI=1, or scrambled by C-RNTI; and, if the uplink grant does not overlap with the PUCCH resource of an SR transmission, where the priority of the logical channel that triggers the SR is higher than the priority of the uplink grant;

the uplink grant is a prioritized uplink grant;

if there is an overlapping uplink grant, the overlapping uplink grant is a de-prioritized uplink grant.

Optionally, in some embodiments of the present disclosure, at least one of the second configured uplink grant, the first target uplink grant, the SR, and the PUCCH resource is not or is not yet a de-prioritized uplink resource.

Optionally, in some embodiments of the present disclosure, the processing module 801 is further configured to:

if the configuration of the SR or the PUCCH resource for transmitting the SR is the target priority comparison manner, and the SR or the PUCCH resource for transmitting the SR satisfies at least one of the following conditions, consider the SR or the PUCCH resource for transmitting the SR to be a prioritized uplink resource:

it does not overlap with other uplink resource; it overlaps with other uplink resource, and the priority of the logical channel that triggers the SR is higher than the priority of other uplink resource; it overlaps with other uplink resource, and the priority of the PUCCH resource for transmitting the SR is higher than that of other uplink resource; it overlaps with other uplink resource, the priority of the logical channel that triggers the SR is lower than or equal to the priority of other uplink resource, and other uplink resource is considered to be a de-prioritized uplink resource; and it overlaps with other uplink resource, the priority of the PUCCH resource for transmitting the SR is lower than or equal to the priority of other uplink resource, and other uplink resource is considered to be a de-prioritized uplink resource.

Optionally, in some embodiments of the present disclosure, the processing module 801 is further configured to:

if the configuration of the SR or the PUCCH resource for transmitting the SR is the target priority comparison manner, and the SR or the PUCCH resource for transmitting the SR satisfies at least one of the following conditions, consider the SR or the PUCCH resource for transmitting the SR to be a de-prioritized uplink resource:

it overlaps with other uplink resource, and the priority of the logical channel that triggers the SR is lower than or equal to the priority of other uplink resource; it overlaps with other uplink resource, and the priority of the PUCCH resource for transmitting the SR is lower than or equal to that of other uplink resource; it overlaps with other uplink resource, the priority of the logical channel that triggers the SR is lower than or equal to the priority of other uplink resource, and other uplink resource is not or is not considered to be a pre-prioritized uplink resource; and, it overlaps with other uplink resource, the priority of the PUCCH resource for transmitting the SR is lower than or equal to the priority of other uplink resource, and said other uplink resource is not or not yet a pre-prioritized uplink resource.

Optionally, in some embodiments of the present disclosure, the uplink grant includes: an uplink grant that is not or not yet a de-prioritized uplink grant; or, the uplink grant includes: an uplink grant whose priority after update is higher than the priority before the update; or, the uplink grant includes: an uplink grant that is not or is not yet a de-prioritized uplink grant, and the priority of the uplink grant after update is higher than the priority before the update.

Optionally, in some embodiments of the present disclosure, the priority of the uplink grant before the update is lower than the priority of the target uplink resource that conflicts with the uplink grant, and the priority of the uplink grant after the update is higher than the priority of the target uplink resource.

Optionally, in some embodiments of the present disclosure, the processing module 801 is further configured to perform uplink transmission according to the specific type of uplink resource.

Optionally, in some embodiments of the present disclosure, the processing module 801 is specifically configured to transmit the specific type of uplink resource if the specific type of uplink resource is a prioritized uplink resource; and/or, the processing module 801 is specifically configured to not transmit the specific type of uplink resource if the specific type of uplink resource is a de-prioritized uplink resource.

Optionally, in some embodiments of the present disclosure, the target priority comparison manner includes: a logical channel-based priority comparison manner.

Figure 9:
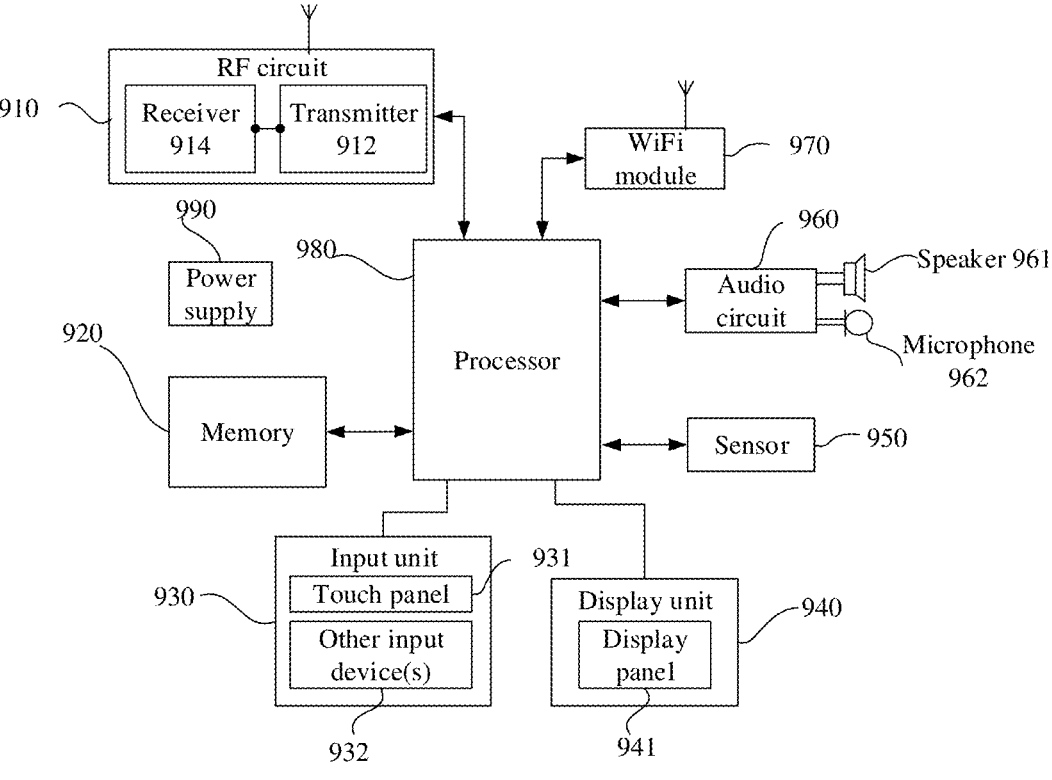
FIG. 9 is a schematic diagram of another embodiment of a terminal device in an embodiment of the present disclosure.

As shown in FIG. 9, it is a schematic diagram of another embodiment of the terminal device in the embodiments of the present disclosure. Taking a mobile phone as an example for illustration, it may include: a radio frequency (RF) circuit 910, a memory 920, an input unit 930, a display unit 940, a sensor 950, an audio circuit 960, a wireless fidelity (WiFi) module 970, a processor 980, a power supply 990 and other components. The radio frequency circuit 910 includes a receiver 914 and a transmitter 912. Those skilled in the art can understand that the structure of the mobile phone shown in FIG. 9 does not constitute a limitation on the mobile phone, and it may include more or less components than shown, or combine some components, or arrange different components.

Hereinafter, in conjunction with FIG. 9, each component of the mobile phone will be introduced in detail.

The RF circuit 910 may be used for receiving and sending signals during sending and receiving of information or during a call. In particular, after receiving the downlink information of the base station, it is processed by the processor 980; in addition, the designed uplink data is sent to the base station. Typically, the RF circuit 910 includes, but is not limited to, an antenna, at least one amplifier, a transceiver, a coupler, a low noise amplifier (LNA), a duplexer, and the like. In addition, the RF circuit 910 may communicate with networks and other devices via wireless communications. The above wireless communication may use any communication standard or protocol, including but not limited to global system of mobile communication (GSM), general packet radio service (GPRS), code division multiple access (CDMA), wideband code division multiple access (WCDMA), long term evolution (LTE), email, short messaging service (SMS) and so on.

The memory 920 may be used to store software programs and modules, and the processor 980 executes various functional applications and data processing of the mobile phone by running the software programs and modules stored in the memory 920. The memory 920 may mainly include a storage program area and a storage data area, where the storage program area may store an operating system, an application program required for at least one function (such as a sound playback function, an image playback function, etc.), etc.; and the storage data area may store data created by the use of the mobile phone (such as audio data, phone book, etc.), etc. Additionally, the memory 920 may include a high-speed random access memory, and may also include a non-volatile memory, such as at least one magnetic disk storage device, flash memory device, or other volatile solid state storage device.

The input unit 930 may be used to receive inputted numerical or character information, and generate key signal input related to user setting and function control of the mobile phone. Specifically, the input unit 930 may include a touch panel 931 and other input devices 932. The touch panel 931, also referred to as a touch screen, may collect touch operations by the user on or near it (such as operations on or near the touch panel 931 by the user using the finger, stylus, or any suitable object or accessory), and drive the corresponding connection apparatus according to the preset program. Optionally, the touch panel 931 may include two parts, i.e., a touch detection apparatus and a touch controller. The touch detection apparatus detects the user's touch orientation, detects the signal brought by the touch operation, and transmits the signal to the touch controller. The touch controller receives the touch information from the touch detection apparatus, converts it into contact coordinates, and then sends them to the processor 980, and may receive the command sent by the processor 980 and execute it. In addition, the touch panel 931 may be implemented in various types such as resistive, capacitive, infrared, and surface acoustic waves. In addition to the touch panel 931, the input unit 930 may further include other input devices 932. Specifically, other input devices 932 may include, but are not limited to, one or more of a physical keyboard, a function key (such as a volume control key, a switch key, etc.), a trackball, a mouse, a joystick, and the like.

The display unit 940 may be used to display information input by the user or information provided to the user and various menus of the mobile phone. The display unit 940 may include a display panel 941. Optionally, the display panel 941 may be configured in the form of a liquid crystal display (LCD), an organic light-emitting diode (OLED), or the like. Further, the touch panel 931 may cover the display panel 941. When the touch panel 931 detects a touch operation on or near it, it transmits the touche operation to the processor 980 to determine the type of the touch event, and then the processor 980 provides a corresponding visual output on the display panel 941 according to the type of the touch event. Although in FIG. 9, the touch panel 931 and the display panel 941 are used as two independent components to realize the input and input functions of the mobile phone, in some embodiments, the touch panel 931 and the display panel 941 may be integrated to realize the input and output functions of the mobile phone.

The mobile phone may also include at least one sensor 950, such as a light sensor, a motion sensor, and other sensors. Specifically, the light sensor may include an ambient light sensor and a proximity sensor, where the ambient light sensor may adjust the brightness of the display panel 941 according to the brightness of the ambient light, and the proximity sensor may turn off the display panel 941 and/or the backlight when the mobile phone is moved to the ear. As a kind of motion sensor, the accelerometer sensor may detect the magnitude of acceleration in all directions (usually three axes), and may detect the magnitude and direction of gravity when being stationary, and may be used for applications that recognize the posture of the mobile phone (such as horizontal and vertical screen switching, related games, magnetometer attitude calibration), vibration recognition related functions (such as pedometer, tapping), etc.; as for other sensors such as a gyroscope, a barometer, a hygrometer, a thermometer, an infrared sensor that may be configured for the mobile phone, details are not repeated here again.

The audio circuit 960, the speaker 961, and the microphone 962 may provide an audio interface between the user and the mobile phone. The audio circuit 960 may convert the received audio data into an electrical signal, and transmit it to the speaker 961, and the speaker 961 converts it into a sound signal for output; on the other hand, the microphone 962 converts the collected sound signal into an electrical signal, which is received and then converted into audio data by the audio circuit 960, and then the audio data is output to the processor 980 for processing, and then the audio data is sent to, for example, another mobile phone through the RF circuit 910, or the audio data is output to the memory 920 for further processing.

WiFi is a short-distance wireless transmission technology. The mobile phone may help users to send and receive emails, browse web pages, and access streaming media through the WiFi module 970. It provides users with wireless broadband Internet access. Although FIG. 9 shows the WiFi module 970, it can be understood that it is not a necessary component of the mobile phone, and may be completely omitted as required within the scope of not changing the essence of the disclosure.

The processor 980 is a control center of the mobile phone, using various interfaces and lines to connect various parts of the entire mobile phone, by running or executing the software programs and/or modules stored in the memory 920, and calling the data stored in the memory 920, the processor 980 performs various functions of the mobile phone and processes data, so as to monitor the mobile phone as a whole. Optionally, the processor 980 may include one or more processing units; for example, the processor 980 may integrate an application processor and a modem processor, where the application processor mainly processes the operating system, user interface, and application programs, etc., and the modem processor mainly deals with wireless communication. It can be understood that, the above-mentioned modem processor may not be integrated into the processor 980.

The mobile phone also includes a power supply 990 (such as a battery) for supplying power to various components. For example, the power supply may be logically connected to the processor 980 through a power management system, so as to manage charging, discharging, power consumption management, and other functions through the power management system. Although not shown, the mobile phone may also include a camera, a Bluetooth module, and the like, which will not be repeated here.

In the embodiments of the present disclosure, the processor 980 is configured to, when the medium access control (MAC) entity is configured with a target priority comparison manner, for each uplink grant; compare a priority of the uplink grant with that of a compared resource.

Optionally, in some embodiments of the present disclosure, the processor 980 is further configured to initialize the uplink grant as a specific type of uplink resource.

Optionally, in some embodiments of the present disclosure, the processor 980 is specifically configured to, when the priority of the uplink grant is compared with that of the compared resource, consider the uplink grant to be a specific type of uplink resource.

Optionally, in some embodiments of the present disclosure, the processor 980 is specifically configured to, before the priority of the uplink grant is compared with that of the compared resource, consider that the uplink grant is the specific type of uplink resource; or, the processor 980 is specifically configured to, after the priority of the uplink grant is compared with that of the compared resource, consider that the uplink grant is the specific type of uplink resource.

Optionally, in some embodiments of the present disclosure, the specific type of uplink resource is a prioritized uplink resource or a de-prioritized uplink resource.

Optionally, in some embodiments of the present disclosure, the compared resource is not or is not yet a de-prioritized uplink resource.

Optionally, in some embodiments of the present disclosure, the processor 980 is specifically configured to:

if the uplink grant is an uplink grant scrambled by CS-RNTI with NDI=1, or scrambled by C-RNTI;

if PUSCH durations of the uplink grant and a first configured uplink grant do not overlap, where the first configured uplink grant and the uplink grant belong to the same BWP, and the first configured uplink grant has a higher priority than the priority of the uplink grant; and, if the uplink grant does not overlap with the PUCCH resource of an SR transmission, where the priority of the logical channel that triggers the SR is higher than the priority of the uplink grant;

the uplink grant is a prioritized uplink grant;

if there is an overlapping uplink grant(s), the overlapping uplink grant(s) is a de-prioritized uplink grant.

Optionally, in some embodiments of the present disclosure, at least one of the first configured uplink grant, the SR, and the PUCCH resource is not or is not yet a de-prioritized uplink resource.

Optionally, in some embodiments of the present disclosure, the processor 980 is specifically configured to:

if the uplink grant is a configured uplink grant;

if PUSCH durations of the uplink grant and a second configured uplink grant do not overlap, where the second configured uplink grant and the uplink grant belong to the same BWP, and the priority of the second configured uplink grant is higher than that of the uplink grant; and, if PUSCH durations of the uplink grant and a first target uplink grant do not overlap, where the first target uplink grant and the uplink grant belong to the same BWP, and the priority of the first target uplink grant is higher than or equal to that of the uplink grant, and the first target uplink grant is an uplink grant scrambled by CS-RNTI with NDI=1, or scrambled by C-RNTI; and, if the uplink grant does not overlap with the PUCCH resource of an SR transmission, where the priority of the logical channel that triggers the SR is higher than the priority of the uplink grant;

the uplink grant is a prioritized uplink grant;

if there is an overlapping uplink grant(s), the overlapping uplink grant(s) is a de-prioritized uplink grant.

Optionally, in some embodiments of the present disclosure, at least one of the second configured uplink grant, the first target uplink grant, the SR, and the PUCCH resource is not or is not yet a de-prioritized uplink resource.

Optionally, in some embodiments of the present disclosure, the processor 980 is further configured to:

if the configuration of the SR or the PUCCH resource for transmitting the SR is the target priority comparison manner, and the SR or the PUCCH resource for transmitting the SR satisfies at least one of the following conditions, the SR or the PUCCH resource for transmitting the SR is considered to be a prioritized uplink resource:

it does not overlap with other uplink resource; it overlaps with other uplink resource, and the priority of the logical channel that triggers the SR is higher than the priority of other uplink resource; it overlaps with other uplink resource, and the priority of the PUCCH resource for transmitting the SR is higher than the priority of other uplink resource; it overlaps with other uplink resource, the priority of the logical channel that triggers the SR is lower than or equal to the priority of other uplink resource, and said other uplink resource is considered to be a de-prioritized uplink resource; and, it overlaps with other uplink resource, the priority of the PUCCH resource for transmitting the SR is lower than or equal to the priority of other uplink resource, and said other uplink resource is considered to be a de-prioritized uplink resource.

Optionally, in some embodiments of the present disclosure, the processor 980 is further configured to:

if the configuration of the SR or the PUCCH resource for transmitting the SR is the target priority comparison manner, and the SR or the PUCCH resource for transmitting the SR satisfies at least one of the following conditions, the SR or the PUCCH resource for transmitting the SR is considered to be a de-prioritized uplink resource:

it overlaps with other uplink resource, and the priority of the logical channel that triggers the SR is lower than or equal to the priority of other uplink resource; it overlaps with other uplink resource, and the priority of the PUCCH resource for transmitting the SR is lower than or equal to that of other uplink resource; it overlaps with other uplink resource, and the priority of the logical channel that triggers the SR is lower than or equal to the priority of other uplink resource, and said other uplink resource is not or is not considered to be a de-prioritized uplink resource; and it overlaps with other uplink resource, and the priority of the PUCCH resource for transmitting the SR is lower than or equal to the priority of other uplink resource, and said other uplink resource is not or not yet a de-prioritized uplink resource.

Optionally, in some embodiments of the present disclosure, the uplink grant includes: an uplink grant that is not or is not yet a de-prioritized uplink grant; or, the uplink grant includes: an uplink grant whose priority after update is higher than the priority before the update; or, the uplink grant includes: an uplink grant that is not or is not yet a de-prioritized uplink grant and the priority of the uplink grant after the update is higher than the priority before the update.

Optionally, in some embodiments of the present disclosure, the priority of the uplink grant before the update is lower than the priority of the target uplink resource that conflicts with the uplink grant, and the priority of the uplink grant after the update is higher than the priority of the target uplink resource.

Optionally, in some embodiments of the present disclosure, the processor 980 is further configured to perform uplink transmission according to the specific type of uplink resource.

Optionally, in some embodiments of the present disclosure, the processor 980 is specifically configured to transmit the specific type of uplink resource if the specific type of uplink resource is a prioritized uplink resource; and/or, the processor 980 is specifically configured to not transmit the specific type of uplink resource if the specific type of uplink resource is a de-prioritized uplink resource.

Optionally, in some embodiments of the present disclosure, the target priority comparison manner includes: a logical channel-based priority comparison manner.

The above-mentioned embodiments may be implemented in whole or in part by software, hardware, firmware or any combination thereof. When implemented in software, they may be implemented in whole or in part in the form of a computer program product. The computer program product includes one or more computer instructions. When the computer program instructions are loaded and executed on a computer, all or part of the processes or functions described in the embodiments of the present disclosure are generated. The computer may be a general purpose computer, a special purpose computer, a computer network, or other programmable apparatus. The computer instructions may be stored in a computer-readable storage medium or transmitted from one computer-readable storage medium to another computer-readable storage medium. For example, the computer instructions may be transmitted from a website site, computer, server, or data center to another website site, computer, server, or data center by wire (e.g., coaxial cable, fiber optic, digital subscriber line (DSL)) or wireless (e.g., infrared, wireless, microwave, etc.) way. The computer-readable storage medium may be any available medium that can be stored by a computer, or a data storage device such as a server, data center, etc., which is integrated by one or more available media. The available media may be a magnetic media (e.g., a floppy disk, a hard disk, a magnetic tape), an optical media (e.g., DVD), or a semiconductor media (e.g., a Solid State Disk (SSD)), etc.

The terms "first", "second", "third", "fourth", etc. (if present) in the description and claims of the present disclosure and the above-mentioned drawings are used to distinguish similar objects and are not necessarily used to describe a specific order or sequence. It is to be understood that data so used may be interchanged under appropriate circumstances so that the embodiments described herein can be practiced in sequences other than those illustrated or described herein. Furthermore, the terms "include" and "have", and any variations thereof, are intended to cover non-exclusive inclusion, for example, a process, method, system, product or device including a series of steps or units is not necessarily limited to those expressly listed steps or units, and may include other steps or units not expressly listed or inherent to these processes, methods, products or devices.

What is claimed is:

1. A method for handling multiple resource conflicts, comprising:

performing, by a terminal device, a comparison between a priority of an uplink grant and a priority of a PUCCH resource for transmitting an SR, wherein, a media access control (MAC) entity of the terminal device is configured with a target priority comparison manner, the target priority comparison manner comprising a comparison of priority based on a logical channel or based on a physical channel, and in response to that the PUCCH resource for transmitting the SR is a resource that overlaps with the uplink grant, and a priority of a logical channel that triggers the SR is higher than the priority of the uplink grant, considering, by the terminal device, the PUCCH resource for transmitting the SR to be a prioritized uplink resource or the uplink grant to be a de-prioritized uplink resource, wherein the performing, by the terminal device, the comparison between the priority of the uplink grant and the priority of the PUCCH resource for transmitting the SR, comprises:

in a case of performing, by the terminal device, the comparison between the priority of the uplink grant and the priority of the PUCCH resource for transmitting the SR, considering, by the terminal device, the uplink grant to be a specific type of uplink resource, wherein the considering the uplink grant as a specific type of uplink resource in a case of performing, by the terminal device, the comparison between the priority of the uplink grant and the priority of the PUCCH resource for transmitting the SR, comprises:

before performing the comparison between the priority of the uplink grant and the priority of the PUCCH resource for transmitting the SR, considering, by the terminal device, the uplink grant to be the specific type of uplink resource;

or, after performing the comparison between the priority of the uplink grant and the priority of the PUCCH resource for transmitting the SR, considering the uplink grant to be the specific type of uplink resource.

2. The method according to claim 1, wherein the specified type of uplink resource is a prioritized uplink resource or a de-prioritized uplink resource.

3. The method according to claim 1, wherein the performing, by the terminal device, the comparison between the priority of the uplink grant and the priority of the PUCCH resource for transmitting the SR, comprises:

if the uplink grant is an uplink grant scrambled by CS-RNTI with NDI=1, or scrambled by C-RNTI;

if PUSCH durations of the uplink grant and a first configured uplink grant do not overlap, wherein the first configured uplink grant and the uplink grant belong to a same BWP, and a priority of the first configured uplink grant is higher than a priority of the uplink grant; and, if the uplink grant does not overlap with a PUCCH resource of an SR transmission, wherein the priority of the logical channel that triggers the SR is higher than the priority of the uplink grant;

the uplink grant being a prioritized uplink grant;

if there is an overlapping uplink grant, the overlapping uplink grant being a de-prioritized uplink grant.

4. The method according to claim 1, wherein the performing, by the terminal device, the comparison between the priority of the uplink grant and the priority of the PUCCH resource for transmitting the SR, comprises:

if the uplink grant is a configured uplink grant;

if PUSCH durations of the uplink grant and a second configured uplink grant do not overlap, wherein the second configured uplink grant and the uplink grant belong to a same BWP, and a priority of the second configured uplink grant is higher than a priority of the uplink grant; and, if PUSCH durations of the uplink grant and a first target uplink grant do not overlap, wherein the first target uplink grant and the uplink grant belong to a same BWP, and a priority of the first target uplink grant is higher than or equal to the priority of the uplink grant, and the first target uplink grant is an uplink grant scrambled by CS-RNTI with NDI=1, or scrambled by C-RNTI; and, if the uplink grant does not overlap with a PUCCH resource of an SR transmission, wherein the priority of the logical channel that triggers the SR is higher than the priority of the uplink grant;

the uplink grant being a prioritized uplink grant;

if there is an overlapping uplink grant, the overlapping uplink grant being a de-prioritized uplink grant.

5. The method according to claim 3, wherein the method further comprises:

if a configuration of the SR or the PUCCH resource for transmitting the SR is the target priority comparison manner, and the SR or the PUCCH resource for transmitting the SR satisfies at least one of following conditions, considering the SR or the PUCCH resource for transmitting the SR to be a prioritized uplink resource:

it does not overlap with other uplink resource;

it overlaps with other uplink resource, and a priority of a logical channel that triggers the SR is higher than a priority of said other uplink resource;

it overlaps with other uplink resource, and a priority of the PUCCH resource for transmitting the SR is higher than the priority of said other uplink resource;

it overlaps with other uplink resource, the priority of the logical channel that triggers the SR is lower than or equal to the priority of said other uplink resource, and said other uplink resource is considered to be a de-prioritized uplink resource; and it overlaps with other uplink resource, the priority of the PUCCH resource for transmitting the SR is lower than or equal to the priority of said other uplink resource, and said other uplink resource is considered to be a pre-prioritized uplink resource.

6. The method according to claim 1, wherein the uplink grant comprises: an uplink grant whose priority after update is higher than the priority before the update.

7. A terminal device, comprising:

a memory in which executable program code is stored; and a processor coupled to the memory;

wherein the processor invokes the executable program code stored in the memory to: perform a comparison between a priority of an uplink grant and a priority of a PUCCH resource for transmitting an SR, wherein, a media access control (MAC) entity of the terminal device is configured with a target priority comparison manner, the target priority comparison manner comprising a comparison of priority based on a logical channel or based on a physical channel, and in response to that the PUCCH resource for transmitting the SR is a resource that overlaps with the uplink grant, and a priority of a logical channel that triggers the SR is higher than the priority of the uplink grant, considering the PUCCH resource for transmitting the SR to be a prioritized uplink resource or the uplink grant to be a de-prioritized uplink resource, wherein the processor is configured to, in a case of performing the comparison between the priority of the uplink grant and the priority of the PUCCH resource for transmitting the SR, consider the uplink grant to be a specific type of uplink resource, wherein the processor is configured to, before performing the comparison between the priority of the uplink grant and the priority of the PUCCH resource for transmitting the SR consider the uplink grant to be the specific type of uplink resource; or, the processor is configured to, after performing the comparison between the priority of the uplink grant and the priority of the PUCCH resource for transmitting the SR, consider the uplink grant to be the specific type of uplink resource.

8. The terminal device according to claim 7, wherein the specific type of uplink resource is a prioritized uplink resource or a de-prioritized uplink resource.

9. The terminal device according to claim 7, wherein the processor is configured to:

if the uplink grant is an uplink grant scrambled by CS-RNTI with NDI=1, or scrambled by C-RNTI;

if PUSCH durations of the uplink grant and a first configured uplink grant do not overlap, wherein the first configured uplink grant and the uplink grant belong to a same BWP, and a priority of the first configured uplink grant is higher than a priority of the uplink grant; and, if the uplink grant does not overlap with a PUCCH resource of an SR transmission, wherein the priority of the logical channel that triggers the SR is higher than the priority of the uplink grant;

the uplink grant is a prioritized uplink grant;

if there is an overlapping uplink grant, the overlapping uplink grant is a de-prioritized uplink grant.

10. The terminal device according to claim 7, wherein the processor is specifically configured to:

if the uplink grant is a configured uplink grant;

if PUSCH durations of the uplink grant and a second configured uplink grant do not overlap, wherein the second configured uplink grant and the uplink grant belong to a same BWP, and a priority of the second configured uplink grant is higher than a priority of the uplink grant; and, if PUSCH durations of the uplink grant and a first target uplink grant do not overlap, wherein the first target uplink grant and the uplink grant belong to a same BWP, and a priority of the first target uplink grant is higher than or equal to the priority of the uplink grant, and the first target uplink grant is an uplink grant scrambled by CS-RNTI with NDI=1, or scrambled by C-RNTI; and, if the uplink grant does not overlap with a PUCCH resource of an SR transmission, wherein the priority of the logical channel that triggers the SR is higher than the priority of the uplink grant;

the uplink grant is a prioritized uplink grant;

if there is an overlapping uplink grant, the overlapping uplink grant is a de-prioritized uplink grant.

11. The terminal device according to claim 10, wherein the processor is further configured to:

if a configuration of the SR or the PUCCH resource for transmitting the SR is the target priority comparison manner, and the SR or the PUCCH resource for transmitting the SR satisfies at least one of following conditions, consider the SR or the PUCCH resource for transmitting the SR to be a prioritized uplink resource:

it does not overlap with other uplink resource;

it overlaps with other uplink resource, and a priority of a logical channel that triggers the SR is higher than a priority of said other uplink resource;

it overlaps with other uplink resource, and a priority of the PUCCH resource for transmitting the SR is higher than the priority of said other uplink resource;

it overlaps with other uplink resource, the priority of the logical channel that triggers the SR is lower than or equal to the priority of said other uplink resource, and said other uplink resource is considered to be a pre-prioritized uplink resource; and it overlaps with other uplink resource, the priority of the PUCCH resource for transmitting the SR is lower than or equal to the priority of said other uplink resource, and said other uplink resource is to be a pre-prioritized uplink resource.

12. The terminal device according to claim 7, wherein the uplink grant comprises: an uplink grant whose priority after update is higher than the priority before the update.

13. The terminal device according to claim 12, wherein the priority of the uplink grant before the update is lower than a priority of a target uplink resource that conflicts with the uplink grant, and the priority of the uplink grant after the update is higher than the priority of the target uplink resource.

14. The terminal device according to claim 7, wherein the processor is further configured to perform uplink transmission according to a specific type of uplink resource.

15. The terminal device according to claim 14, wherein the processor is configured to, if the specific type of uplink resource is a prioritized uplink resource, transmit the specific type of uplink resource; and/or, the processor is configured to, if the specific type of uplink resource is a pre-prioritized uplink resource, not transmit the specific type of uplink resource.

16. A computer-readable storage medium comprising instructions which, when executed on a computer, cause the computer to perform:

performing a comparison between a priority of an uplink grant and a priority of a PUCCH resource for transmitting an SR, wherein, a media access control (MAC) entity of the terminal device is configured with a target priority comparison manner, the target priority comparison manner comprising a comparison of priority based on a logical channel or based on a physical channel, and in response to that the PUCCH resource for transmitting the SR is a resource that overlaps with the uplink grant, and a priority of a logical channel that triggers the SR is higher than the priority of the uplink grant, considering the PUCCH resource for transmitting the SR to be a prioritized uplink resource or the uplink grant to be a de-prioritized uplink resource, wherein the performing the comparison between the priority of the uplink grant and the priority of the PUCCH resource for transmitting the SR, comprises:

in a case of performing the comparison between the priority of the uplink grant and the priority of the PUCCH resource for transmitting the SR, considering the uplink grant to be a specific type of uplink resource, wherein the considering the uplink grant as a specific type of uplink resource in a case of performing the comparison between the priority of the uplink grant and the priority of the PUCCH resource for transmitting the SR, comprises:

before performing the comparison between the priority of the uplink grant and the priority of the PUCCH resource for transmitting the SR, considering the uplink grant to be the specific type of uplink resource;

or, after performing the comparison between the priority of the uplink grant and the priority of the PUCCH resource for transmitting the SR, considering the uplink grant to be the specific type of uplink resource.

* * * * *